(12) United States Patent
Hughes et al.

(10) Patent No.: US 10,781,116 B2
(45) Date of Patent: Sep. 22, 2020

(54) DEVICES, SYSTEMS AND METHODS FOR TREATMENT OF LIQUIDS WITH ELECTROMAGNETIC FIELDS

(71) Applicant: Reverse Ionizer Systems, LLC, Bethesda, MD (US)

(72) Inventors: Patrick J. Hughes, Vienna, VA (US); Desmond A. Fraser, Herndon, VA (US); Hossein Ghaffari Nik, Fairfax, VA (US); Richard B. McMurray, Fairfax, VA (US); Robert A. Sutherland, Scottsville, VA (US)

(73) Assignee: Reverse Ionizer Systems, LLC, Bethesda, MD (US)

( * ) Notice: Subject to any disclaimer, the term of this patent is extended or adjusted under 35 U.S.C. 154(b) by 0 days.

(21) Appl. No.: 14/624,552

(22) Filed: Feb. 17, 2015

(65) Prior Publication Data

US 2015/0239757 A1  Aug. 27, 2015

Related U.S. Application Data

(63) Continuation-in-part of application No. 14/170,546, filed on Jan. 31, 2014.

(Continued)

(51) Int. Cl.
*C02F 1/48* (2006.01)
*C02F 1/463* (2006.01)
(Continued)

(52) U.S. Cl.
CPC ............. *C02F 1/487* (2013.01); *C02F 1/463* (2013.01); *C02F 1/465* (2013.01); *G21F 9/10* (2013.01);
(Continued)

(58) Field of Classification Search
CPC .... C02F 2201/002; C02F 1/484; C02F 1/487; C02F 2201/48; B01J 19/129
See application file for complete search history.

(56) References Cited

U.S. PATENT DOCUMENTS 5,152,341 A   10/1992  Kasevich
5,173,169 A   12/1992  Garrison et al.
(Continued)

FOREIGN PATENT DOCUMENTS

WO    WO 96/12677      5/1996
WO    WO2007133634    11/2007
(Continued)

OTHER PUBLICATIONS http://www.dolphinwatercare.com/how-the-dolphin-system-works, Dolphin Watercare web site, "How it works: The Technology of Sustainable Water Treatment".
(Continued)

*Primary Examiner* — Nicholas A Smith
(74) *Attorney, Agent, or Firm* — Capitol Patent & Trademark Law Firm, PLLC

(57) ABSTRACT

Devices, systems and methods for applying electromagnetic fields to liquids, such as water, to treat unwanted material in the liquid are disclosed. Such devices, systems and methods may include a cylindrically shaped, water-immersible probe configured to generate electromagnetic fields that are effective to treat unwanted materials, such as scale, and microbes in the water.

24 Claims, 14 Drawing Sheets

Related U.S. Application Data

(60) Provisional application No. 61/759,345, filed on Jan. 31, 2013.

(51) Int. Cl.
*C02F 1/465* (2006.01)
*G21F 9/10* (2006.01)
*C02F 101/00* (2006.01)

(52) U.S. Cl.
CPC .................. *C02F 2101/006* (2013.01); *C02F 2201/4612* (2013.01); *C02F 2201/4614* (2013.01); *C02F 2209/005* (2013.01); *C02F 2209/008* (2013.01); *C02F 2209/02* (2013.01); *C02F 2209/05* (2013.01); *C02F 2209/06* (2013.01); *C02F 2209/10* (2013.01); *C02F 2303/22* (2013.01)

(56) References Cited

U.S. PATENT DOCUMENTS

| | | |
|---|---|---|
| 5,326,446 A | 7/1994 | Binger |
| 5,422,481 A | 6/1995 | Louvet |
| 5,568,121 A * | 10/1996 | Lamensdorf ......... G08B 25/016 340/502 |
| 5,598,572 A * | 1/1997 | Tanikoshi ............ G05B 19/042 342/450 |
| 5,667,677 A | 9/1997 | Stefanini |
| 5,738,766 A | 4/1998 | Jefferson |
| 6,063,267 A | 5/2000 | Crewson et al. |
| 6,375,829 B1 | 4/2002 | Shevchenko et al. |
| 6,641,739 B2 | 11/2003 | Dresty, Jr. et al. |
| 7,244,360 B2 | 7/2007 | Cho |
| 7,419,603 B2 | 9/2008 | Cho |
| 2001/0035342 A1* | 11/2001 | Morse ................... B01J 19/087 204/164 |
| 2005/0199484 A1* | 9/2005 | Olstowski ............. C01B 13/11 204/176 |
| 2006/0196817 A1 | 9/2006 | Crewson et al. |
| 2007/0120563 A1 | 5/2007 | Kawabata et al. |
| 2008/0264800 A1 | 10/2008 | Schlager et al. |
| 2009/0206974 A1 | 8/2009 | Meinke |
| 2011/0284231 A1 | 11/2011 | Becker |
| 2012/0217815 A1 | 8/2012 | Clark |
| 2013/0146464 A1 | 6/2013 | Shiga |
| 2013/0277045 A1* | 10/2013 | Parsche ............... E21B 43/2401 166/248 |
| 2014/0216936 A1* | 8/2014 | Hughes .................. C02F 1/487 204/557 |
| 2014/0326681 A1 | 11/2014 | Denvir et al. |
| 2014/0374236 A1 | 12/2014 | Moore et al. |
| 2015/0143918 A1 | 5/2015 | Schaefer et al. |
| 2016/0016829 A1 | 1/2016 | Hughes et al. |

FOREIGN PATENT DOCUMENTS

| | | |
|---|---|---|
| WO | WO2008062171 A1 | 5/2008 |
| WO | WO2011080679 | 7/2011 |

OTHER PUBLICATIONS

Cho et al., Mitigation of Calcium Carbonate Fouling Using RF Electric Fields, Proc. of Intl. Conf. on Heat Exchange Fouling and Cleaning VIII, pp. 384-391, Jun. 2009, Austria.

* cited by examiner

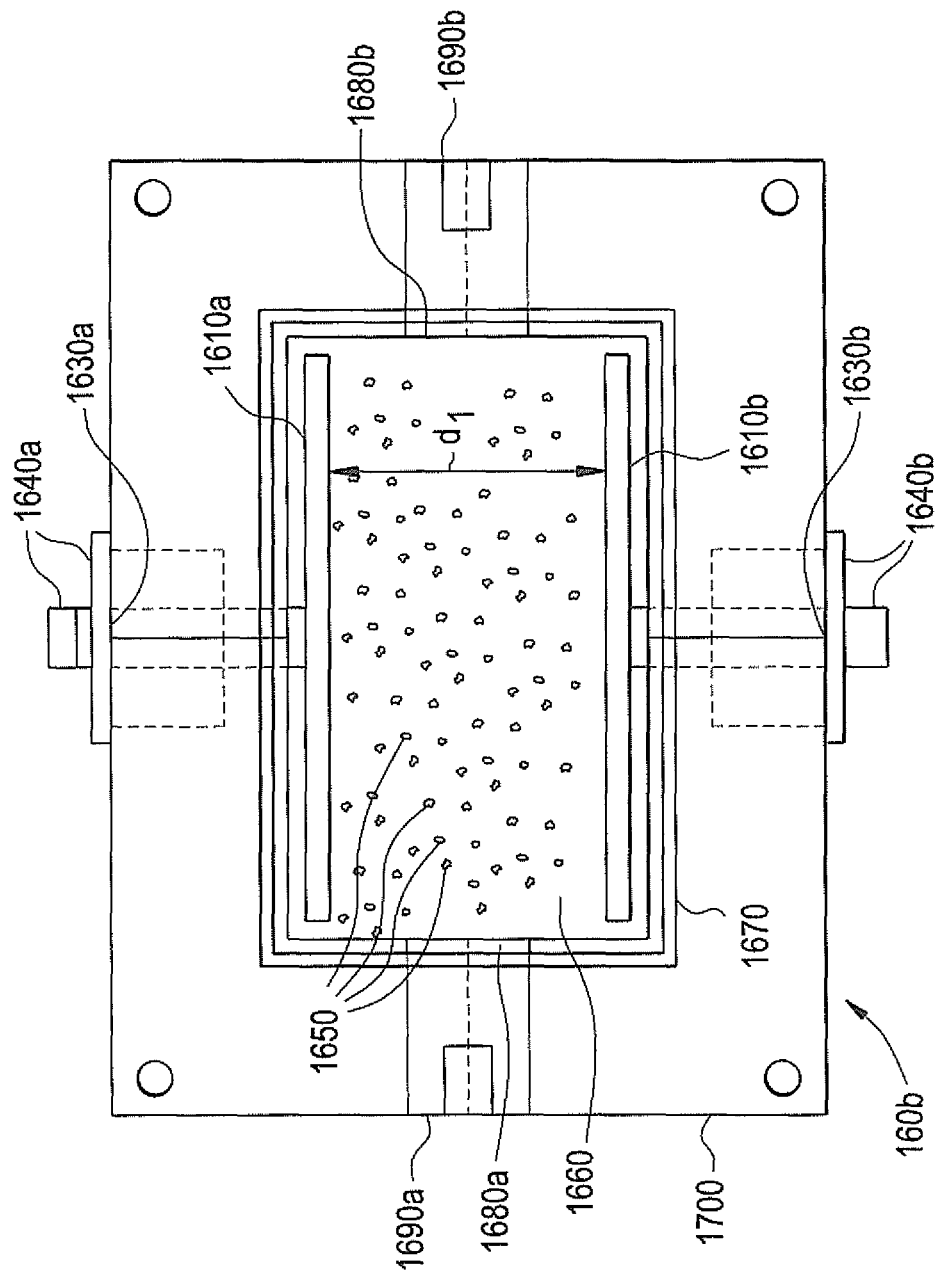

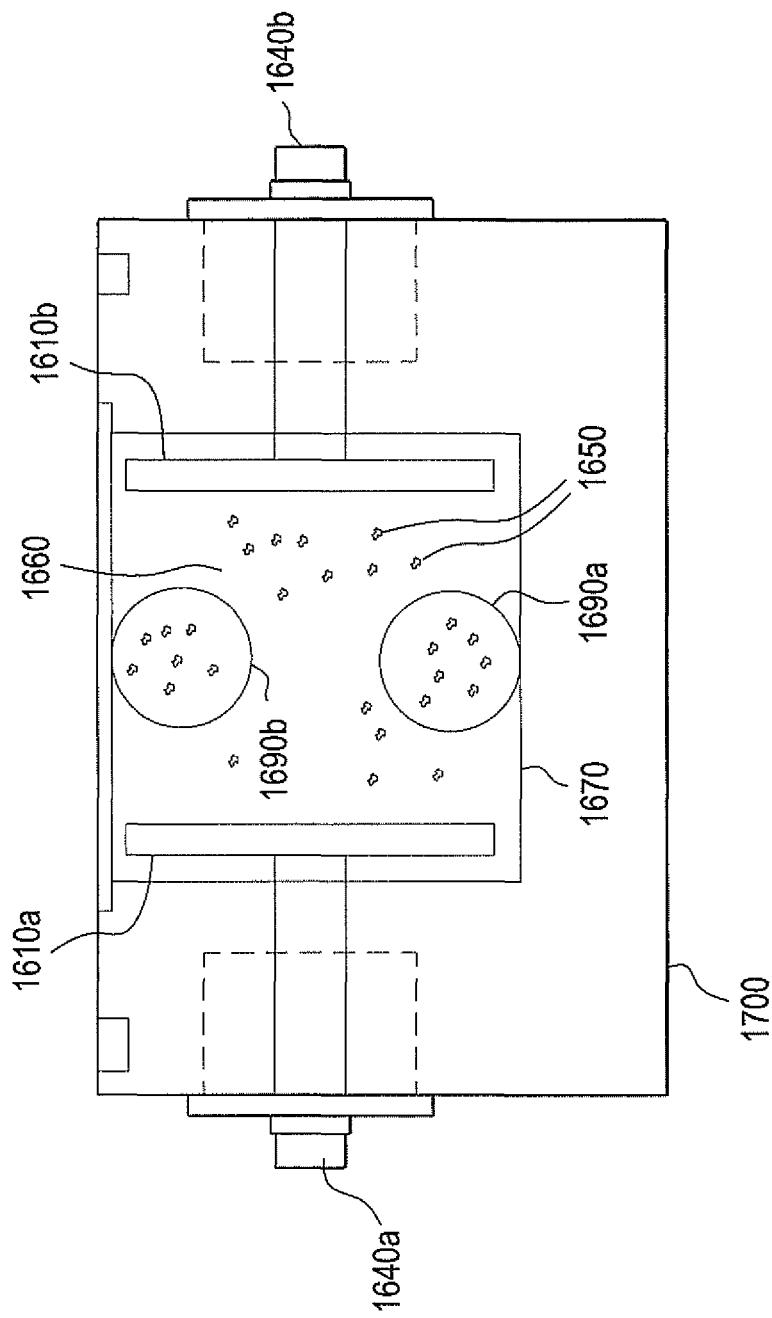

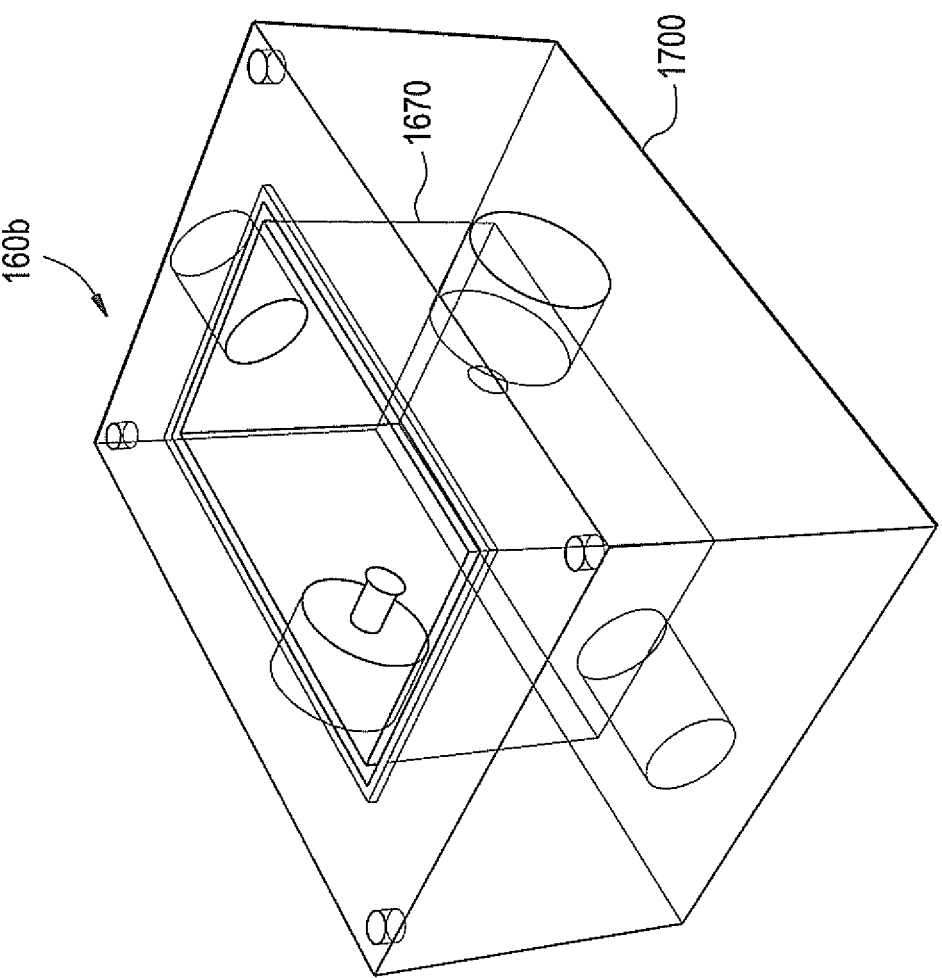

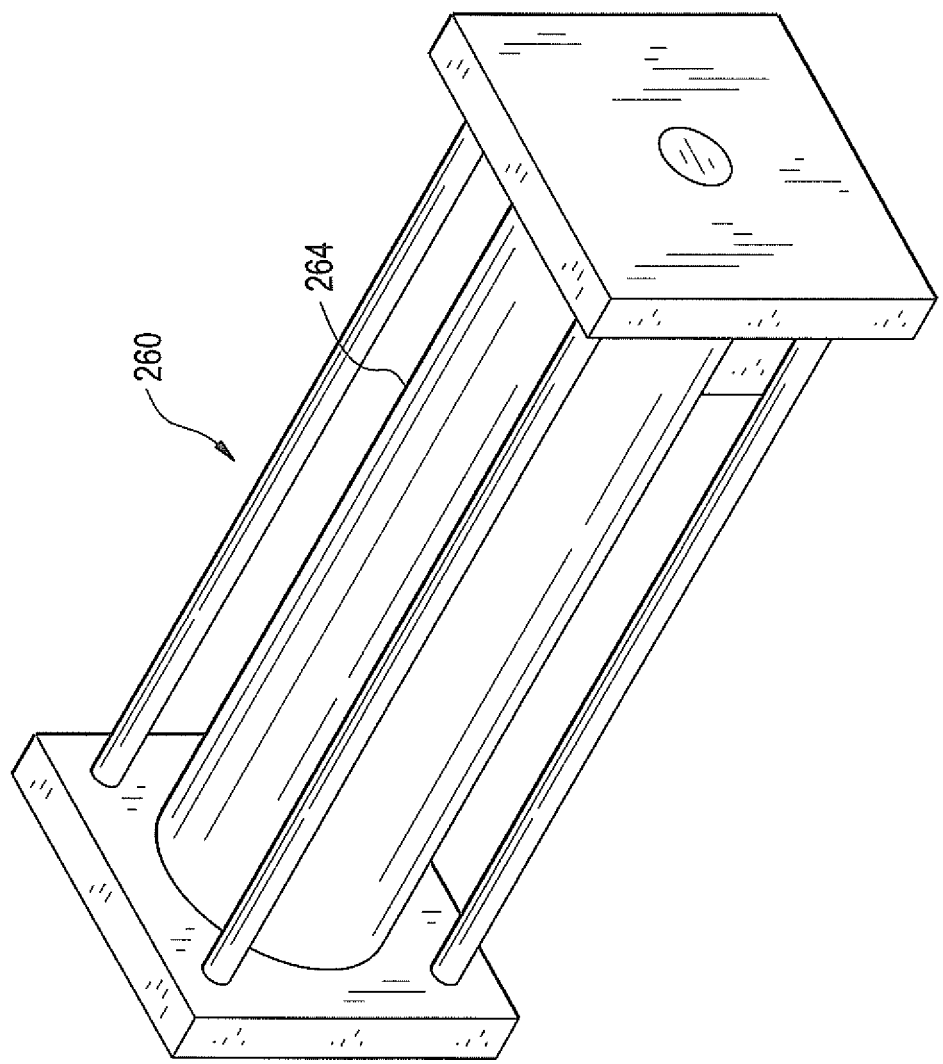

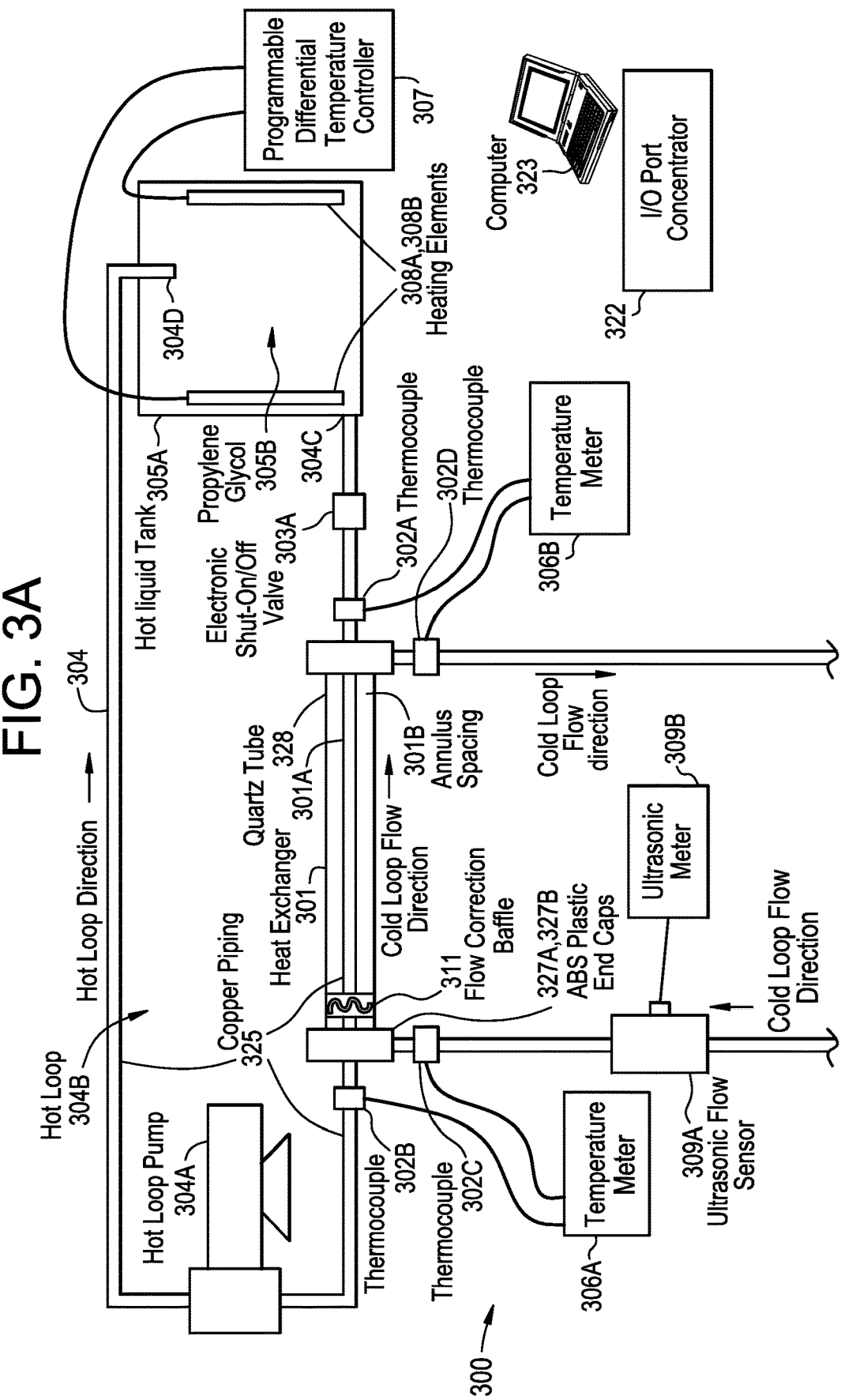

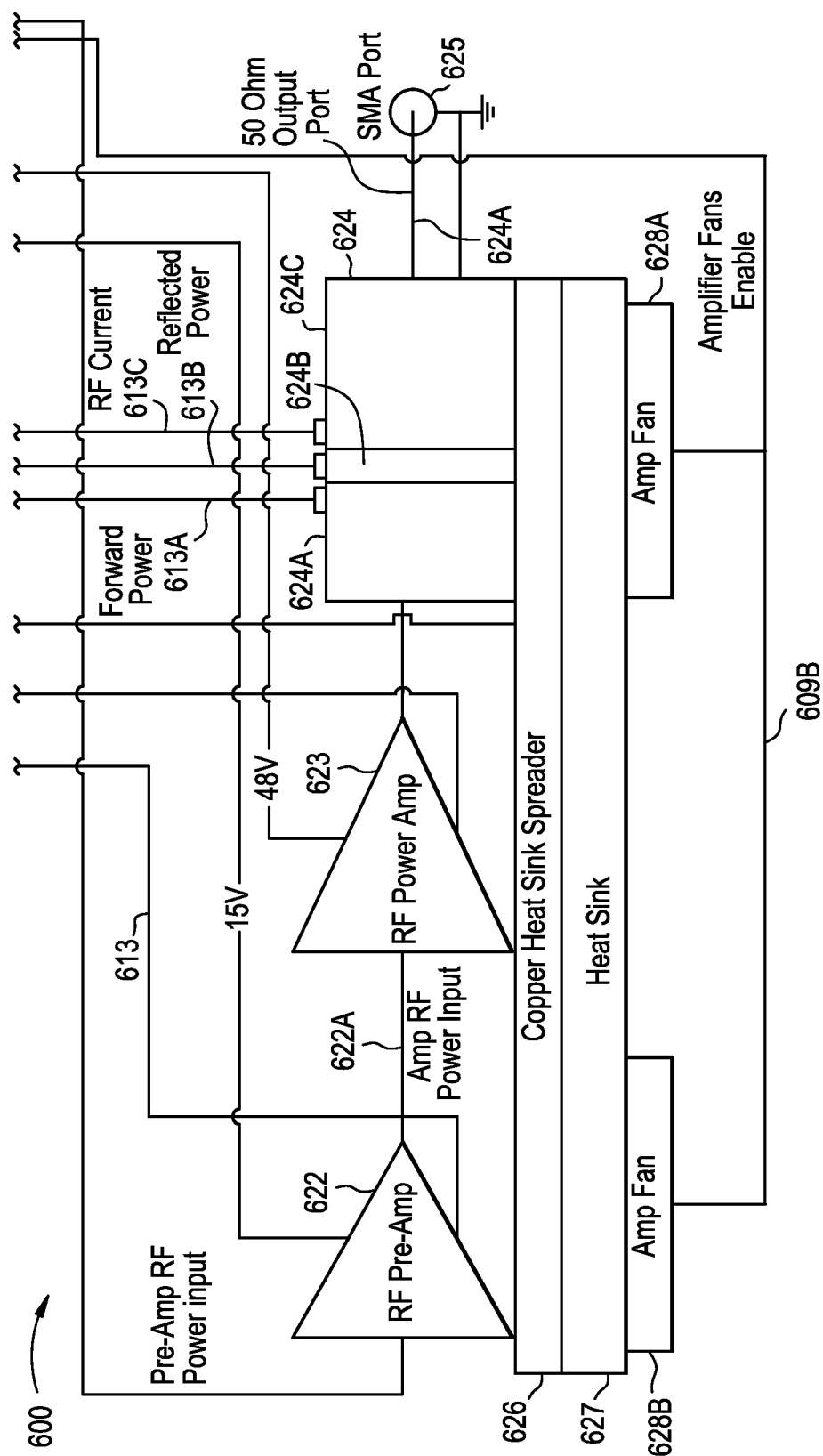

ic (mineral) impurities, a low frequency varying electromagnetic field for handling biological contaminants and a radio frequency varying electromagnetic field for handling biological contaminants and breaking up scale formations. The electromagnetic fields of Binger appear to be applied in conjunction with a high output of negative ions into the water. It is believed that this combination of electromagnetic fields and ionic generation is capable of attacking a broad spectrum of impurities and contaminants commonly found in water. Binger has its limitations and disadvantages, however.

DEVICES, SYSTEMS AND METHODS FOR TREATMENT OF LIQUIDS WITH ELECTROMAGNETIC FIELDS

RELATED APPLICATIONS

This application is a continuation-in-part of, and claims the benefit of priority from, U.S. patent application Ser. No. 14/170,546 filed Jan. 31, 2014 ("'546 Application") and U.S. Provisional Patent Application No. 61/759,345 filed Jan. 31, 2013 ("'345 Application"). The present application incorporates by reference herein the entire disclosure of the '546 and '345 Applications, including their text and drawings, as if set forth in their entirety herein.

INTRODUCTION

Devices and methods that use electromagnetic fields and energy to purify or alter the characteristics of water are known. For example, U.S. Pat. No. 5,326,446, issued to Binger on Jul. 5, 1994, ("Binger") appears to disclose methods and devices for purifying water of mineral impurities and biological contaminants (e.g., bacteria, protozoa, algae and fungi). The devices and methods of Binger appear to employ a static electromagnetic field capable of treating ionic (mineral) impurities, a low frequency varying electromagnetic field for handling biological contaminants and a radio frequency varying electromagnetic field for handling biological contaminants and breaking up scale formations. The electromagnetic fields of Binger appear to be applied in conjunction with a high output of negative ions into the water. It is believed that this combination of electromagnetic fields and ionic generation is capable of attacking a broad spectrum of impurities and contaminants commonly found in water. Binger has its limitations and disadvantages, however.

It is desired to provide devices, systems and methods for treating liquids that overcome the limitations and disadvantages of conventional devices, systems and methods. More specifically, it is desirable to provide devices, systems and methods for treating liquids that provide greater control over the application of electromagnetic energy to liquids, a greater range and variability of the voltage, current, frequency and waveform shape of electromagnetic energy applied to liquids, and high operational reliability and safety.

SUMMARY

Devices, systems and methods for treating liquids with electromagnetic fields are provided. The devices, systems and methods disclosed herein are particularly applicable to treating liquids, such as water, in a water supply system.

According to one embodiment, a system for treating a liquid that contains unwanted material may comprise: an immersible device comprising a positive conductive element, and a negative conductive element, the elements configured with respect to one another to reduce fringing effects, and to generate an electromagnetic field to treat unwanted material in a liquid. To reduce fringing effects the surface area or length of the positive conductive element may be 0.75 to 0.90 the surface area or length of the negative conductive element.

Further, in an embodiment the positive conductive element may comprise a first cylindrical structure, and the negative conductive element may comprise a second cylindrical structure, and both elements may be coaxially aligned with one another.

An exemplary system for treating liquids that contains unwanted material may additionally comprise an electromagnetic waveform generator for generating an output signal, and for applying the output signal to an immersible device to generate the electromagnetic field. Yet further, the system may comprise a microcontroller for controlling the generator.

In yet another embodiment, a system for treating a liquid that contains unwanted material may comprise a smart probe control system that is operable to adjust an impedance to minimize impedance mismatches. Such a smart probe control system may include a microcontroller operable to compute a voltage standing wave ratio (VSWR) based on forward and reflected powers, and an impedance tuning section. The tuning section may include one or more capacitors and inductors that may be selected (or de-selected) by the microcontroller in order to adjust a VSWR. Additionally, the microcontroller may select a low impedance or high impedance relay as a part of adjusting an impedance. The microcontroller may be operable to continuously compute VSWR values and compare such computed values to a stored reference, such as a VSWR value of 1.5:1, in order to obtain an optimum VSWR value and a minimum impedance mismatch.

In yet additional embodiments, the microcontroller or other parts of a treatment system may communicate data related to treatment of a liquid to a testing apparatus, such as a portable test set, or handheld test set. When the data (or instructions) are sent (or received) to/from a remote location, a modem may be used to transmit or receive such data and instructions related to treatment of the liquid. In some cases, remote service or maintenance personnel may need to view the data. Accordingly, in another embodiment an interface may be provided at a remote station to permit data, related to treatment of the liquid, that has been exchanged between an inventive treatment system and the remote station to be viewed or otherwise accessed by such service or maintenance personnel.

In addition to the systems described above, the present invention provides alternative devices for treating a liquid that contains unwanted material.

For example, one such device comprises a cylindrical, positive conductive element, and a cylindrical, negative conductive element, the elements being coaxially aligned with one another and where a length of the positive conductive element is 0.75 to 0.90 the length of the negative conductive element. The elements are configured to generate an electromagnetic field to treat unwanted material in a liquid.

Another device comprises a cylindrical, positive conductive element, and a cylindrical, negative conductive element, the elements being coaxially aligned with one another and configured to generate an electromagnetic field to treat unwanted material in a liquid.

In addition to the systems and devices described above, the present invention also provides for methods for treating a liquid that contains unwanted material. One such exemplary method may comprise: immersing a device comprising a positive conductive element, and a negative conductive element in a liquid that contains unwanted material; configuring the elements with respect to one another to reduce fringing effects, and generating an electromagnetic field to treat the unwanted material in the liquid.

To configure the elements with respect to one another to reduce fringing effects the method may further include configuring the elements such that a surface area or length of the positive conductive element is 0.75 to 0.90 the surface area or length of the negative conductive element.

As a part of the method the positive conductive element and the negative conductive element can be configured or pre-configured as cylindrical structures, and coaxially aligned with one another.

In addition the method may additionally include the generation of an output signal, and application of the so-generated output signal to an immersible device so that the device can generate an electromagnetic field used to treat a liquid that contains unwanted material.

In a further embodiment, another method may include the steps described above, and, in addition, adjusting an impedance of components making up a treatment system to avoid impedance mismatches that may damage components of such a system. In order to avoid impedance mismatches a method may include computing a voltage standing wave ratio (VSWR) of components of a treatment system based on forward and reflected powers.

Thereafter, the method may apply coarse or fine tuning of a VSWR through the selection of one or more of capacitors and inductors in a tuning section, and by the selection of a low impedance or high impedance relay that is also a part of the tuning section. VSWRs may be continuously computed and compared against a stored reference, such as a VSWR value of 1.5:1, in order to obtain an optimum VSWR and minimum impedance mismatch.

Similar to the systems described above, the present invention also provides methods for communicating data, related to treatment of a liquid that contains unwanted material, to a testing apparatus. In one method, data may be transmitted or received to, or from, a remote station where it may be viewed via an interface by service or maintenance personnel.

According to additional embodiments, the devices, systems and related methods disclosed herein can be adapted to treat unwanted material in a liquid such as water.

Additional devices, systems, related methods, features and advantages of the invention will become clear to those skilled in the art from the following detailed description and appended drawings.

BRIEF DESCRIPTION OF THE DRAWINGS

FIG. 2B depicts one view of a capacitive device that utilizes conductive elements according to one embodiment of the invention.

FIG. 2C depicts a second view of the capacitive device shown in FIG. 2B.

FIG. 2D depicts a third view of the capacitive device shown in FIG. 2B.

FIG. 2E depicts one view of an alternative capacitive device according to an embodiment of the invention.

FIGS. 3A and 3B depict an exemplary, experimental water supply system according to embodiments of the invention.

FIGS. 3C and 3D depict an electromagnetic waveform generator according to an embodiment of the invention.

DETAILED DESCRIPTION

Figure 1:
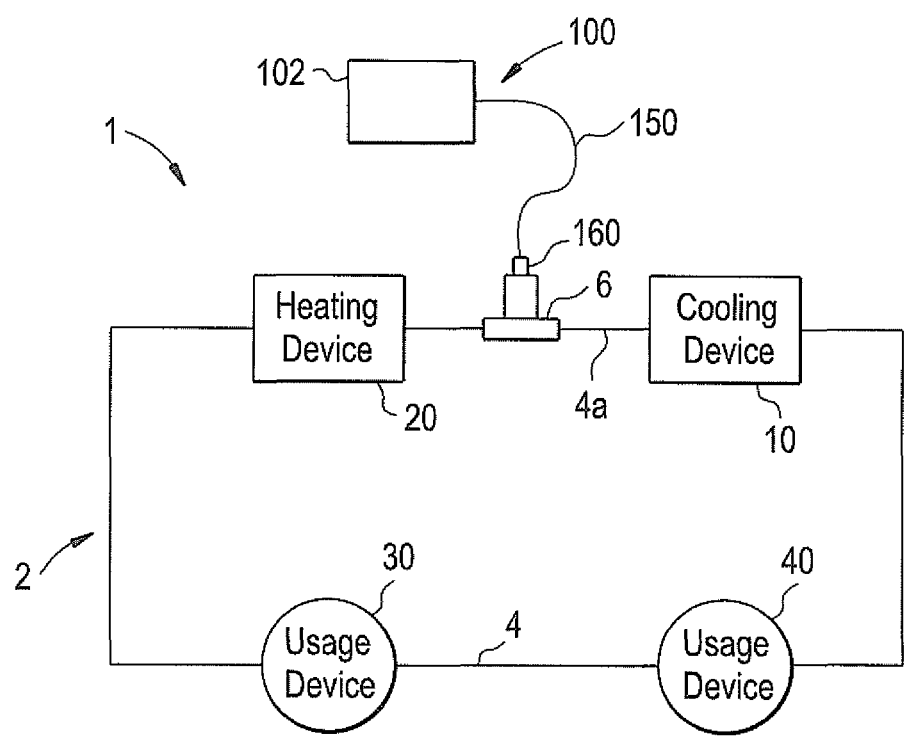
FIG. 1 is a schematic drawing showing an exemplary water supply system including an electrical water treatment system, according to an embodiment.

Exemplary embodiments of devices, systems and related methods for treating liquids with electromagnetic fields are described herein and are shown by way of example in the drawings. Throughout the following description and drawings, like reference numbers/characters refer to like elements.

It should be understood that, although specific exemplary embodiments are discussed herein, there is no intent to limit the scope of present invention to such embodiments. To the contrary, it should be understood that the exemplary embodiments discussed herein are for illustrative purposes, and that modified and alternative embodiments may be implemented without departing from the scope of the present invention.

It should also be noted that one or more exemplary embodiments may be described as a process or method. Although a process/method may be described as sequential, it should be understood that such a process/method may be performed in parallel, concurrently or simultaneously. In addition, the order of each step within a process/method may be re-arranged. A process/method may be terminated when completed, and may also include additional steps not included in a description of the process/method.

As used herein, the term "and/or" includes any and all combinations of one or more of the associated listed items. As used herein, the singular forms "a," "an" and "the" are intended to include the plural form, unless the context and/or common sense indicates otherwise.

As used herein, the term "embodiment" refers to an embodiment of the present invention.

As used herein the phrase "unwanted material" includes all types of material, in dissolved or undissolved form which degrades or otherwise detracts from a desired quality of a liquid, such as water. A non-limiting list of unwanted material includes, but is not limited to: scale, microbes, corrosive minerals, and contaminants of all kinds.

As used herein the phrases "treat", "treating," "treatment" and other tenses of the word treat mean the reduction, removal, minimization, dissolution and elimination of unwanted material and the prevention of such unwanted material. Further the phrases "treating a liquid" and "treating unwanted material" and their other tenses may be used synonymously herein to describe the treatment of a liquid that contains unwanted material.

The phrase "liquid" means any known fluid that is typically involved in, but not limited to, cooling and heating processes. One non-limiting example of a fluid is water, where by "water" is meant, but is not limited to, non-potable water, potable water and water that contains a combination of natural and man-made chemicals and minerals.

As used herein the phrase "probe" means one of the inventive, capacitive devices described herein that may be used to treat a liquid that contains unwanted material.

It should be understood that when the description herein describes the use of a "microcontroller" or "computer" that such a device includes stored, specialized instructions for completing the associated, described features and functions. Such instructions may be stored in an onboard memory or in separate memory devices. Such instructions are designed to integrate specialized functions and features into the microcontroller or computer that are used to complete inventive methods and processes related to treating a liquid that contains unwanted material by controlling one or more inventive systems or devices/components used in such a treatment.

FIG. 1 shows an exemplary water supply system 1, according to an embodiment. The water supply system 1 may include a water supply 2, pipe system 4, a cooling device (e.g., chiller) 10, a heating device (e.g., boiler or water heater) 20 and water usage devices 30, 40. While the system 1 is shown as a single loop, it should be understood that an actual water supply system may include more than one loop, and further, such loops may be a combination of an open loop and closed loop system. Nonetheless, to simplify the following explanation the system 1 shown in FIG. 1 will suffice. The pipe system 4 supplies water to and interconnects the cooling device 10, the heating device 20 and the usage devices 30, 40. Each of the usage devices 30, 40 can be any type of device or appliance that uses water from the pipe system 4. It should be understood that the system 1 is merely one example of a water supply system and, although the system 1 is shown as having a single cooling device 10, a single heating device 20 and two usage devices 30, 40, many different numbers, types and combinations of devices 10, 20, 30 and 40 may be used.

Still referencing FIG. 1, the water supply system 1 includes an electromagnetic water treatment system 100 having a main unit or power unit 102 and a probe 160 comprising oppositely charged elements configured with respect to one another to reduce fringing effects (described in more detail below). The probe 160 may be connected to the main unit 102 by an electrically conductive cable 150. The probe 160 can be inserted in-line with a pipe 4a or other component of the pipe system 4 by a fixture 6. It should be understood that it is possible to provide additional water treatment systems 100. For example, larger water supply systems, or systems with multiple pipe locations that are likely to promote the growth of unwanted materials, such as scale, may benefit from having multiple water treatment systems 100.

Generally stated, and as described later in more detail, the water treatment system 100 can apply one or more electromagnetic output fields to the water in the water supply 2 via the probe 160. With the proper application of electromagnetic field(s), the water treatment system 100 can effectively treat water that includes unwanted materials in the water supply 2. As will be described later in more detail, the system 100 can generate a wide variety of electromagnetic fields depending upon the particular application and existing water conditions. Adjustments can be made to the system 100 to utilize a static electromagnetic field, a high, low or medium frequency electromagnetic output field, a combination of multiple high frequency, low frequency, and/or medium frequency electromagnetic fields. For example, frequencies in the following frequency bands may be used by any of the inventive systems, devices and methods described herein: 1 to 2 MHz, 5 to 6 MHz, 13 to 14 MHz, 27 to 28 MHz, 40 to 41 MHz, 433 to 435 MHz and 902 to 928 MHz to name just a few exemplary ranges. Further, in one embodiment, 40.68 MHz may be used as a default frequency. Electromagnetic fields that have various wave shapes (e.g., sine, triangular, square, saw tooth or pulse) may also be used by any of the inventive systems, devices and methods described herein. Additionally, the electromagnetic fields generated by the system 100 (and any inventive system, device and method described herein) can be adaptively varied in frequency, voltage, current and/or waveform shape (e.g., amplitude modulation (AM), frequency modulation (FM)) based on conditions of the water in the water supply 2.

Figure 2A:
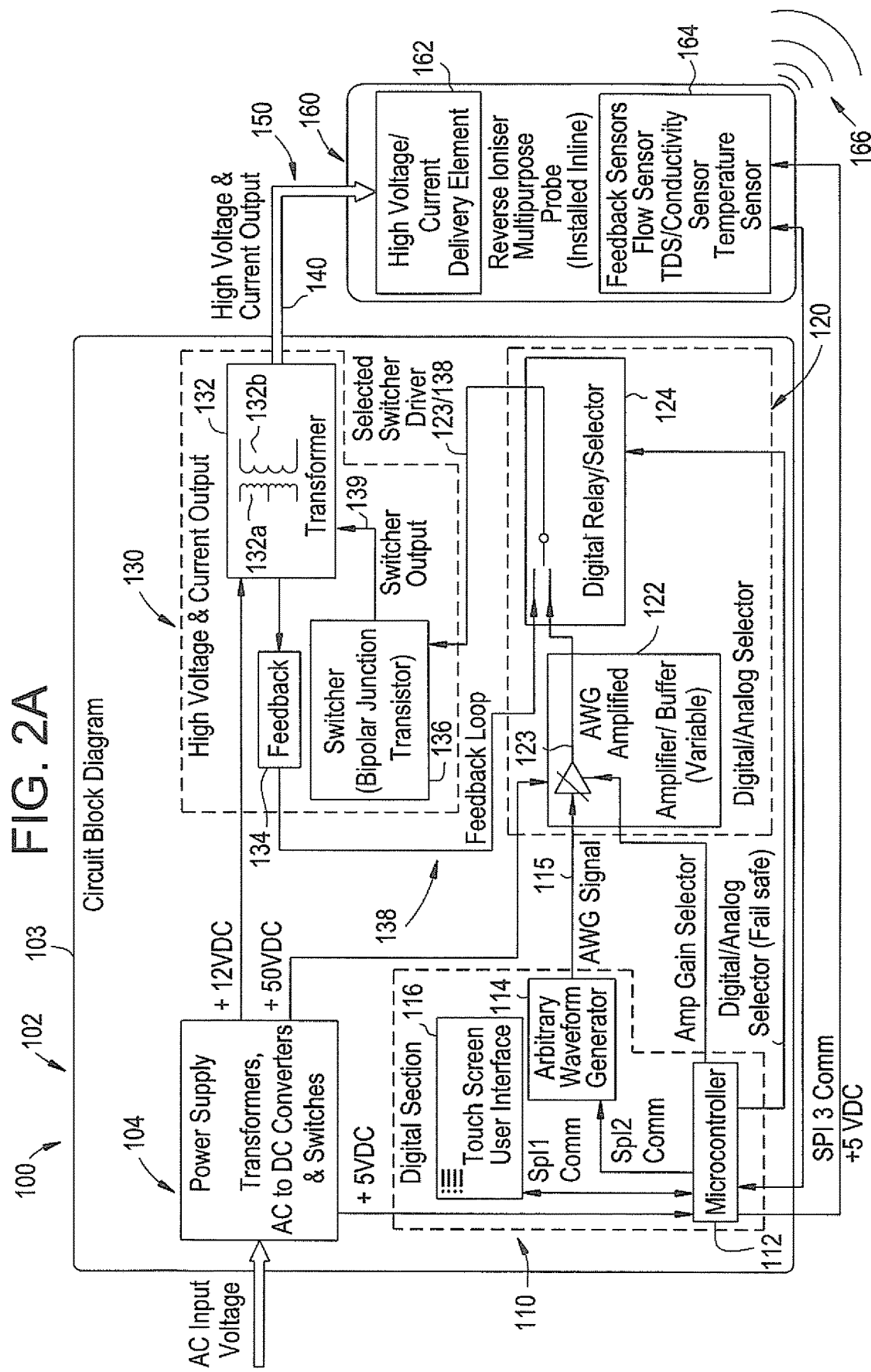
FIG. 2A is a schematic representation of the electrical water system device shown in FIG. 1, according to an embodiment.

FIG. 2A shows an exemplary embodiment of a water treatment system 100. As shown in FIG. 2A, the main unit 102 includes power supply 104, a digital control section 110, a digital/analog selector section 120 and an output section 130. The power supply 104 can be connected to an AC input voltage and supplies power to the digital control section 110, the digital/analog selector section 120 and the output section 130. The power supply 104, the digital control section 110, the digital/analog selector section 120 and the output section 130 can be mounted or contained in a housing or casing 103.

Still referencing FIG. 2A, the digital control section 110 may include a control device or microcontroller 112 connected to the power supply 104, an electromagnetic waveform generator 114 ("generator") and a user input device or touch screen user interface 116. The generator 114 may be controlled by the microcontroller 112 and can be an integrated circuit configured to generate digital input signals 115 of various waveforms (e.g., sine, triangular, square, saw tooth and pulse waveforms, AM modulation, FM modulation) that may be input to the digital/analog selector section 120. The microcontroller 112 interfaces with the user interface 116, which can accept user inputs indicating desired characteristics of the electromagnetic field(s) 166 output by the system 100. The microcontroller 112 may operate the generator 114 based on information input to the user interface 116. The characteristics (e.g., modulation, voltage, current, frequency and waveform shape) of the digital input signals 115 vary based on the user inputs indicating the desired characteristics of the electromagnetic field 166. Additionally, the user interface 116 can display waveform settings and feedback information from connected sensors 164.

As shown in FIG. 2A, the digital/analog selector section 120 includes an amplifier/buffer 122 and a digital relay/selector 124. The amplifier/buffer 122 may be connected to the microcontroller 112 and the generator 114. The digital relay/selector 124 may be connected to the microcontroller 112 and may be connected at its input side to the output of the amplifier/buffer 122. The amplifier/buffer 122 may be powered by the power supply 104, and may be operable to receive the digital input signals 115 from the generator 114 and amplify the digital input signals 115 to generate digital driver signals 123. The gain of the amplifier/buffer 122, and, therefore, the amplitude of the digital driver signals 123 may be controlled by the microcontroller 112 based on the desired characteristics of the electromagnetic field 166. The amplifier/buffer 122 may be selectively connectable to an input side of the digital relay/selector 124 such that the digital driver signals 123 can be forwarded from the amplifier/buffer 122 to the digital relay/selector 124.

Continuing with reference to FIG. 2A, the output section 130 may include an output amplifier or output transformer 132 powered by the power supply 104, a feedback filter device 134 configured to receive feedback signals 133 from a primary winding 132a of the output transformer 132 and selectively connectable to the input side of the digital relay/selector 124, and a switcher (e.g., bipolar junction transistor) 136 connected to an output side of the digital relay/selector 124 and the input side of the transformer 132.

As indicated above, the microcontroller 112 may be programmed with specialized instructions such that, in a default, digital, operational mode of the system 100, the amplifier/buffer 122 may be connected to the input side of the digital relay/selector 124 and the feedback filter device 134 may be disconnected from the input side of the digital relay/selector 124. Thus, the microcontroller 112 and generator 114 may operate to digitally drive the output transformer 132 with the digital driver signals 123. In comparison to analog driver signals, the digital driver signals 123 typically provide much greater control over the characteristics of the electromagnetic field 166 generated by the system 100. More specifically, driving the output transformer 132 with the digital driver signals 123 typically provides greater options with respect to controlling the modulation, frequency, voltage, current and waveform shape of the electromagnetic field 166.

In the digital operational mode, the digital driver signals 123 may be sent to the switcher 136 through the digital relay/selector 124. The switcher 136 modifies the digital driver signals 123 to generate switcher signals 139 and then supplies the switcher signals 139 to the input side of the output transformer 132. The secondary winding 132b of the output transformer 132 then generates output signals 140 based on the digital driver signals 123 and delivers the output signals 140 to the probe 160 through the cable 150.

Referring still to FIG. 2A, in a backup (analog) or failsafe operational mode, upon receiving signals from the microcontroller 112 the amplifier/buffer 122 may be disconnected from the input side of the digital relay/selector 124 and the feedback filter device 134 may be connected to the input side of the digital relay/selector 124. Using, stored, specialized instructions the backup or failsafe operational mode may be initialized by the microcontroller 112 upon detection of a failure of the digital control section 110 by the microcontroller 112 and other components of the system 100, or the backup or failsafe operational mode can be manually selected by a user through the user interface 116.

In the backup or failsafe mode, the primary winding 132a of the output transformer 132 and the feedback filter device 134 operate to drive the secondary winding 132b of the output transformer 132 with analog driver signals 138. More specifically, the feedback filter device 134 filters/modifies the feedback signals 133 to generate the analog driver signals 138. The analog driver signals 138 may be fed to the switcher 136 via the digital relay/selector 124. The switcher 136 modifies the analog driver signals 138 to generate switcher signals 139. The switcher signals 139 may be supplied to the input side of the output transformer 132. Thus, a feedback loop may be formed by the output transformer 132, the feedback filter device 134, the digital relay/selector 124 and the switcher 136. These components function as a feedback oscillator to operate the system 100 in an analog mode. The secondary winding 132b of the output transformer 132 generates output signals 140 based on the analog driver signals 138 and delivers the output signals 140 to the probe 160 through the cable 150. When the system 100 is operated in this analog mode, the possible ranges and types of modulation, frequency, voltage, current and waveform shapes may be limited in comparison to the digital mode. In the analog mode, the electromagnetic output fields 166 can be controlled by analog controls (not shown) or, alternatively, by signals from the microcontroller 112, where such signals may be based on stored, specialized instructions formulated and integrated into the microcontroller 112 via the user interface 116, for example.

Still referencing FIG. 2A, the probe 160 can be a water-immersible, member including a high voltage/high current delivery element 162. The delivery element 162 can be constructed of any electrically conductive material, however, it is preferable that the delivery element 162 be constructed of a corrosion-resistant material such as stainless steel, aluminum or graphite, for example. The delivery element 162 may be configured to receive the output signals 140 and generate the electromagnetic fields 166 based on the output signals 140. The electromagnetic fields 166 can be suitable for treating a liquid in the water supply 2 that contains unwanted material (FIG. 1).

The probe 160 can optionally include one or more feedback sensors 164. The feedback sensors 164 may be connected to the microcontroller 112 and controlled by stored, specialized instructions. For example, the sensors 164 can be controlled such that they can be calibrated by the microcontroller 112, and/or provide the microcontroller 112 with feedback information related to water conditions. By way of example, the feedback sensors 164 may be selected from among one or more of the following types of sensors: a total dissolved solids (TDS)/conductivity sensor, a flow rate sensor, a temperature sensor and a pH sensor, to name just a few types of sensors. These sensors may be configured to provide the microcontroller 112 feedback information (e.g., data in the form of real world signals) regarding a total dissolved solids level/conductivity of the water, a flow rate of the water, a temperature of the water and a pH of the water, respectively, for example. Based on such information from the sensors 164, the microcontroller may control components of system 100 to adjust the characteristics (e.g., modulation, voltage, frequency, current and/or waveform shape) of the output electromagnetic fields 166 can be varied adaptively (automatically by the microcontroller 112 based on pre-programmed settings) or manually by a user in order to treat liquids in the water supply 2 that contain unwanted materials (FIG. 1).

In embodiments in which the probe 160 does not include sensors 164, the sensors can be provided separately and used in a similar manner to set and maintain optimal electromagnetic fields for the system 100.

In the embodiment shown in FIG. 2A, the generator 114 may be a high voltage, current driven generator operable to generate sine, square, triangular waveforms in the 1 to 10 KHz range. In the embodiment shown in FIG. 2A, neither the generator 114 nor the probe 160 necessarily has a matching impedance (e.g., 50 ohms), though such generators and probes are within the scope of the present invention. For example, such a generator and probes are described in with respect to FIGS. 2E through 4, for example.

Referring now to FIGS. 2B through 2D there are depicted views of a capacitive device 160b according to embodiments of the invention. As shown, the device 160b may comprise elements 1610a,1610b that may be configured with respect to one another to reduce fringing effects. In more detail, device 160b may comprise: a positive conductive element 1610a; a negative conductive element 1610b separated from the first conductive element 1610a by an adjustable distance, $d_1$; means for supplying and/or applying an electrical signal 1630a,1630b, such as a power unit and electrical wires, having a first polarity to the positive conductive element 1610a and an electrical signal having a second, opposite polarity to the negative conductive element 1610b to create an electromagnetic field between the first and second elements 1610a,1610b to treat a liquid in the electromagnetic field that contains unwanted materials. The device may further include means for moving 1640a,1640b the positive and negative conductive elements 1610a,1610b to adjust the adjustable distance $d_1$, (such as a control system that includes a servo-motor or another controllable motor along with a motor controller), in order to change a resonant frequency of the created electrical field to maximize the treatment of a liquid (such as mineralized water) within the electromagnetic field that contains unwanted materials 1650, such as scale. It should be understood that the unwanted material 1650 depicted in the figures is not shown to scale. That is, it has been enlarged for illustrative purposes. In many cases the unwanted material is microscopic and cannot be seen by the naked eye. In the embodiments depicted in FIGS. 2B through 2D the elements 1610*a*,1610*b* may comprise plates that may be configured with respect to one another to reduce fringing effects, and may be enclosed by a treatment chamber 1670. The chamber 1670 may be operable to surround the elements 1610*a*,1610*b*, and comprise first and second openings 1680*a*,1680*b* connected to input and output supply lines 1690*a*,1690*b* (e.g., pipes) that operate to supply a liquid 1660, such as mineralized water, into the chamber 1670 (via line 1690*a*, for example) and operate to allow such a liquid to exit the chamber 1670 (via line 1690*b*, for example). In one embodiment the chamber 1670 may be a chamber having the dimensions of 3 inches in length, 3 inches in width and 5 inches in height while the openings 1680*a*,1680*b* and associated lines 1690*a*,1690*b* may have a diameter of ½ inch.

The probe 160*b* may comprise a support structure 1700 that provides support for, and encloses components 1610*a* through 1690*b*, for example. The support structure 1700 may be made from a Delrin material, for example.

As depicted the first and second elements 1610*a*, 1610*b* may comprise respective, substantially parallel plates that may be configured with respect to one another to reduce fringing effects. For example, in an embodiment of the invention, the surface area of the respective plates 1610*a*, 1610*b* are not the same in order to reduce the effects of fringing. Fringing refers to the portion of an electromagnetic field that is not located between the two elements but instead extends outside of the area between the elements. For example, that portion which surrounds the perimeter or edge of each element. Because this field is outside of the area between the two elements it is not usually involved in the treatment of unwanted materials (e.g., scale) from liquid that flows between the two elements.

In accordance with one embodiment, to reduce the effects of fringing, or, said another way, to focus more of the electromagnetic field to the area between the two elements 1610*a*,1610*b*, the elements 1610*a*,1610*b* may be configured as different sized or shaped elements with respect to one another. That is, different sized or shaped elements may be used. The different sized or shaped elements affect the shape of the resulting electromagnetic field such that more of the field is located in the area between the two elements 1610*a*, 1610*b* than outside the area.

For example, the ratio of the surface area of the positive element 1610*a* to the surface area of the negative element 1610*b* may be in the range 0.75 to 0.90. That is to say the surface area of the positive element 1610*a* may be only 75% to 90% of the surface area of the negative element 1610*b* (i.e., the positive element is smaller than the negative element). In an embodiment of the invention, the different surface areas of the elements 1610*a*, 1610*b* reduces the effects of fringing. It should be noted that although the elements 1610*a*,1610*b* in FIGS. 2B and 2C are depicted as if they are of equal size (e.g., length) and surface area this is not the case. Rather, the sizes and surface areas of the two elements 1610*a*,1610*b* differ in order to achieve a reduction in fringing effects described herein.

Continuing, as depicted the elements 1610*a*,1610*b* may be perpendicularly attached to the means for moving 1640*a*, 1640*b* the first or second conductive elements 1610*a*,1610*b*.

In one example means 1640*a*, 1640*b* may comprise a control system (microcontroller, etc.,) and, in addition, horizontally aligned rods attached to a suitable servo-motor or other motor, and a motor control system (e.g., programmable controller; not shown for clarity). The rods may be made from stainless steel, for example. In one example, the dimensions of each rod may be ½ inch in diameter, and 6 inches in length. In an embodiment, the rods may be compression fitted on each side of the chamber 1670.

Referring more specifically now to FIG. 2C, in one example, mineral water 1660 may traverse a path through the treatment chamber 1670. For example, water 1660 may be input into the chamber 1670 from supply line 1690*a* located at the bottom of the chamber 1670. Once within chamber 1670, the water 1660 may flow between elements 1610*a*, 1610*b* and then be output from supply line 1690*b* at the top of the chamber 1670. The configuration depicted in FIGS. 2B-D permits a sufficient amount of water to flow through the chamber 1670 in order to treat a sufficient amount of unwanted material (e.g., scale), such as calcium carbonate.

In one exemplary operation for treating unwanted materials (e.g., scale) from the liquid 160 (e.g., water), an electrical current having a first polarity may be applied by means 1630*a* to the first element 1610*a* and an electrical current having a second, opposite polarity may be applied by means 1630*b* to the second element 1610*b*. Means 1630*a*, 1630*b* may, for example, comprise a power unit, associated electrical wiring and other components well known in the art. Upon application of the electrical currents a resulting electromagnetic field is created within the chamber 1670. In an embodiment of the invention, the field lines of the electromagnetic field traverse the water 1660 within the chamber 1670 between the elements 1610*a*,1610*b*. As described herein, the application of the electromagnetic field to the water 166 reduces the amount of unwanted material (e.g., scale) 1650 in the water 1660.

Upon application of the electrical current the elements 1610*a*,1610*b* may function as a capacitor whose capacitance is dependent the distance $d_1$ between the elements and the dielectric constant of the mineralized water or other liquid 1660 within chamber 1670.

In more detail, changing the effective distance $d_1$ between elements 1610*a*,1610*b* changes the resonance frequency of the parallel plate capacitor formed by the elements 1610*a*, 1610*b* while the electrical currents are applied, as well as changing the flow rate of a liquid passing between the elements 1610*a*,1610*b* and resulting impedance.

It should be understood that the distance $d_1$ may be selected based on a number of factors. For example, given the fact the distance $d_1$ between elements 1610*a*, 1610*b* traverses a volume of liquid flowing in the chamber 1670, $d_1$ should be selected such that an intended or flow rate of a water supply system is met. That is to say, a given water supply system typically requires water (or another liquid) to flow at a particular rate. In accordance with an embodiment of the invention, when an inventive probe, such as probe 160*b*, is connected to such a water supply system the particular flow rate should be maintained.

In an alternative embodiment of the invention, using the resonant frequency of a given mineral or element present in a liquid, such as water, may also aid in the treatment of a liquid that contains unwanted material. For example, a frequency set to the resonant frequency of a mineral such as calcium may cause the calcium to remain in a dissolved form, and thus prevent the calcium from forming scale in the form of a solid or particulate (e.g., calcium carbonate).

Accordingly, in an embodiment of the invention, the distance, $d_1$, between the plates determines a certain capacitance that is a function of the sum product of the liquid's permittivity and the plate area divided by $d_1$. As a result, varying the size of $d_1$ will change the resulting capacitance. The inductance of the plates and the resultant capacitance from varying the size of $d_1$ (i.e., tuning) creates a series resonant circuit, in which the resonant frequency is proportional to the reciprocal of the sum of 2 times it times the sum of the square root of the resultant capacitance and the inductance of elements 1610a, 1610b. Thus, modulating the resonant frequency using the ionic cyclotron resonance frequency of a mineral, such as calcium carbonate, will cause calcium to remain soluble in the liquid.

In the embodiments shown in FIGS. 2B through 2D, the impedance of probe 160b is not necessarily fixed (e.g., to 50 Ohms) but may vary based on the chemistry of the liquid it is immersed, or in contact with. Further, the impedance of the probe 160b is not necessarily matched to a generator (e.g., 50 ohms). That said, a probe with a substantially fixed impedance (e.g., 50 Ohms) that is matched to a generator is within the scope of the present invention. For example, such a probe is described in with respect to FIGS. 2E through 4, for example.

Figure 2F:
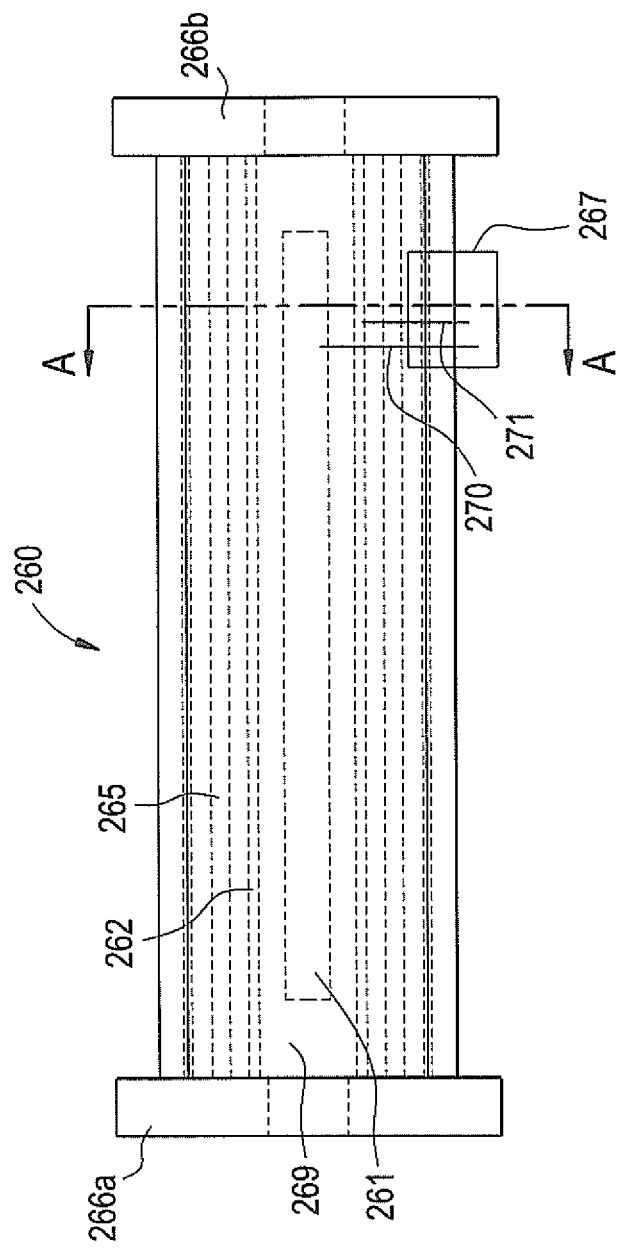
FIG. 2F depicts a second view of the capacitive device shown in FIG. 2E.
Figure 2G:
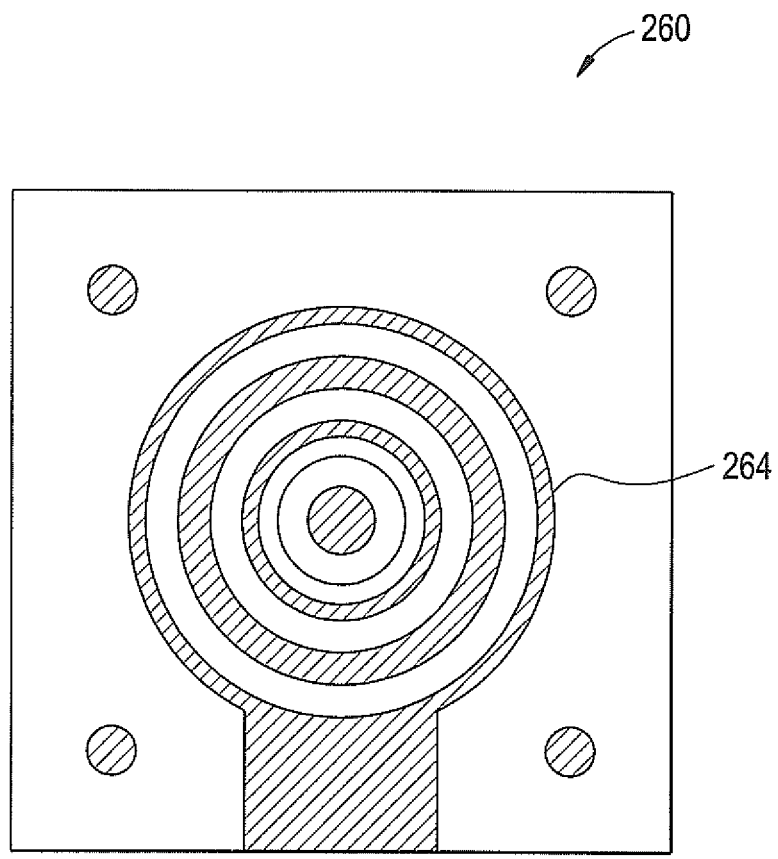
FIG. 2G depicts a third view of the capacitive device shown in FIG. 2E.

FIGS. 2E through 2G depict views of an alternative capacitive device 260 that utilizes coaxially aligned, cylindrical structures as elements instead of plates according to an embodiment of the invention. Though FIGS. 2F and 2G may include dimensional information, it should be understood that these are exemplary only, and other dimensions may be substituted.

Referring to FIGS. 2E through 2G, probe 260 may comprise a cylindrical housing 264 made of 303-stainless steel material, for example. Shown inside the housing 264 is: a horizontally aligned non-conducting cylindrical tube 265 made of Delrin material, for example; a horizontally aligned stainless steel cylindrical tube 262 made of 303-stainless steel material, for example, hereafter referred to as the positive element; a horizontally aligned stainless steel cylindrical rod 261 made of 303-stainless steel material, for example, referred to hereafter as the negative element; two threaded end-caps 266a,b made of 303-stainless steel material, for example, for connecting the housing 264 to two pipes made of 0.750 inch stainless steel (not shown) for inputting and outputting a liquid, such as mineralized water into, and out of, the housing 264. As shown elements 261, 262 are coaxially aligned with one another. Elements 261, 262 may be configured with respect to one another to reduce fringing effects.

In exemplary embodiments, some typical dimensions of the components described above are:

housing 264: 3.25 inches in diameter, 12 inches in length, having a wall or thickness of 0.125 inches;

cylindrical tube 265: 2.0 inches in diameter, 0.25 inch wall thickness and 12 inches in length;

cylindrical tube 262: 1.5 inches in diameter, 0.125 inch wall thickness, and 10 inches in length;

cylindrical rod 261: 0.5 inch in diameter, and 8 inches in length; and threaded end-caps 266: each 5.0 inches by 5.0 inches by 0.750 inches with threads for 0.750 inch thick stainless steel pipes.

Two compression fittings 270, 271 may be electrically connected to the positive and negative elements 261,262. The other ends of the compression fittings 270, 271 function as electrical terminals for connecting the probe 260 to a terminal block 267. The annulus spacing between the elements 261,262 forms a treatment chamber 269.

In an embodiment, the elements 261,262 may form a cylindrically shaped, coaxial capacitor whose capacitance depends on the annulus spacing between the elements 261, 262 and the dielectric constant of the liquid (e.g., mineralized water) flowing in the probe 260. Changing the effective annulus spacing of the elements changes the resonance frequency of the probe when electrically stimulated. In an exemplary embodiment, this annulus spacing may be 2 inches, for example.

Tuning the probe 260 to a resonant frequency of a given mineral or element present in a liquid, such as water, may also aid in the treatment of a liquid that contains unwanted material.

In accordance with one embodiment, to reduce the effects of fringing the elements 261,262 may be configured with respect to one another to reduce fringing effects. Said another way, two different sized elements 261, 262 are used. The different sized elements affect the shape of the resulting electromagnetic field such that more of the field is located in the area between the two elements 261, 262 than outside the area.

For example, the ratio of the length of the positive element 261 to the length of the negative element 262 may be in the range 0.75 to 0.90, for example. That is to say the length of the positive element 261 may be only 75% to 90% of the length of the negative element 262 (i.e., the positive element is shorter than the negative element). In an embodiment of the invention, the different lengths of the elements 261,262 reduces the effects of fringing.

Figure 3B:
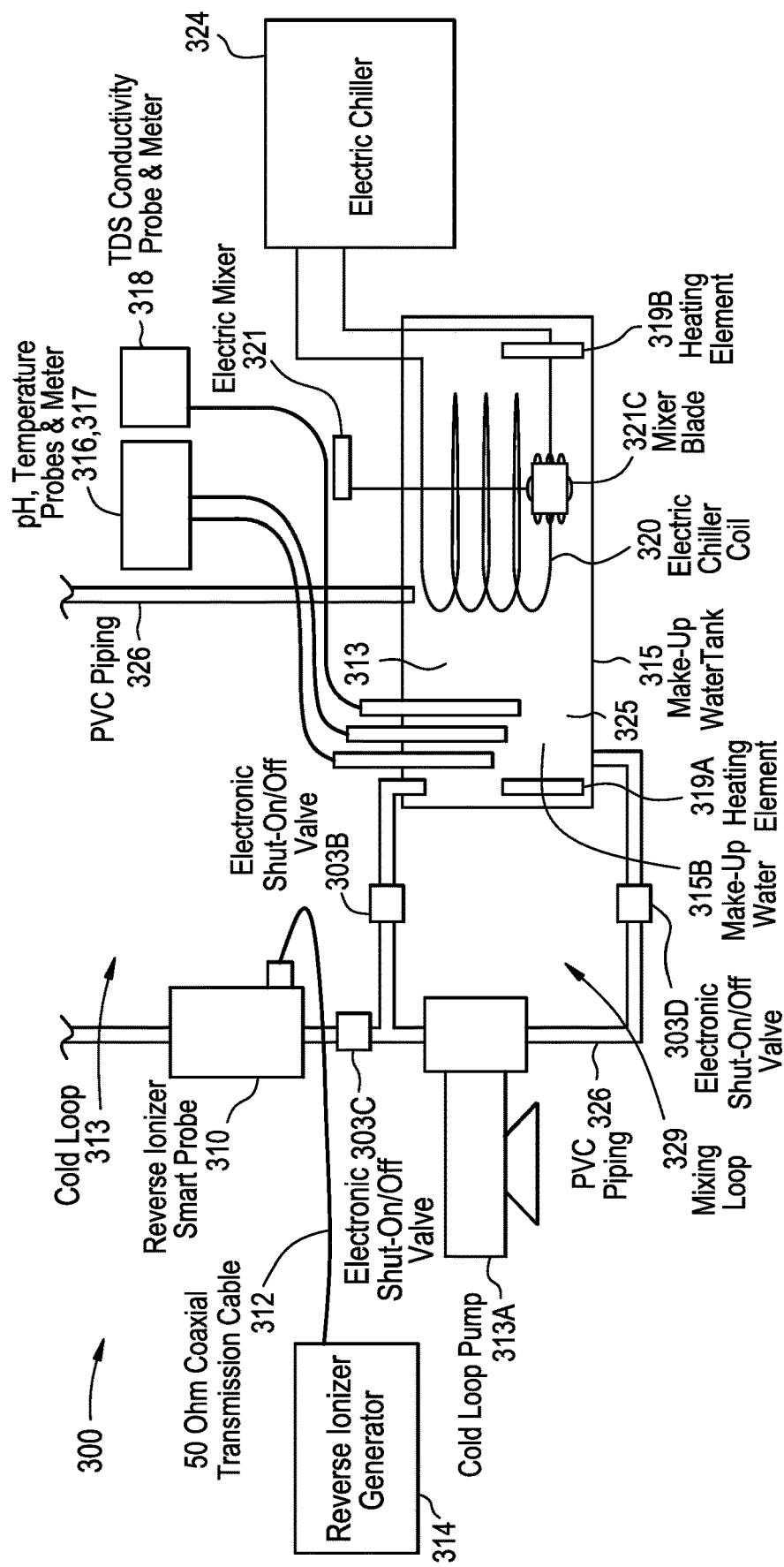
Figure 3C:
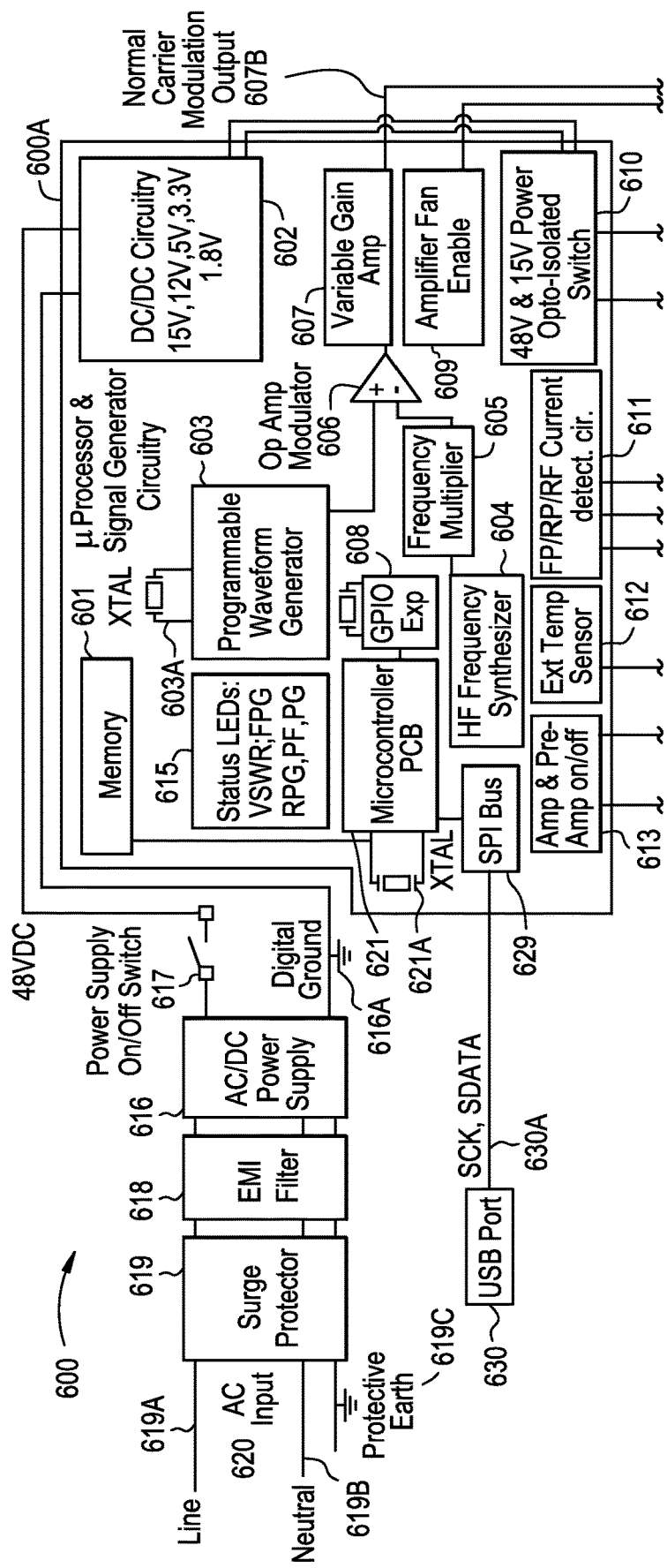

In an embodiment of the invention, probe 260 may have an impedance of 50 Ohms that is impedance matched to a generator, such as generator 600 depicted in FIG. 3C. Impedance matching may be completed through the use of an impedance matching control system, such as the smart probe control system 400 depicted in FIG. 4.

Referring back to FIG. 2A, to use the system 100, the system 100 may be connected to an AC power source and a probe 160, 160b, 260 can be inserted in-line with a pipe (e.g., pipe 4a in FIG. 1) or other component of a water supply system using a fixture (e.g., fixture 6 in FIG. 1 or the structures described in FIGS. 2B through 2G such that the probe 160,160b, 260 is immersed in or directly contacts liquid (e.g., water) from the pipe. It may be preferable to insert the probe at or near a location that is susceptible to the formation or accumulation of unwanted material (e.g., scale, microbes, etc.,). Once the probe is installed in the water supply system, desired characteristics of the electromagnetic field(s) 166 can be input via the user interface 166 and the main unit 102 can be operated to generate the electromagnetic field(s) 166 and apply the field(s) to the water such that existing unwanted material in the water supply system are treated. The system 100 can be operated substantially continuously or intermittently as required to achieve desired water treatment goals. As indicated above, based on feedback information from sensors 164 or similar sensors within the water supply system, the characteristics of the output electromagnetic fields 166 can be varied adaptively (automatically by the microcontroller 112 based on pre-programmed, stored specialized instructions and settings) or manually by a user in order to optimize the treatment of a liquid that contains unwanted material.

In general, it is believed that electromagnetic fields in the radio frequency spectrum will prevent the buildup of unwanted material, such as scale deposits directly on an inventive probe described herein. It is also believed that radio frequency electromagnetic fields break up unwanted materials (e.g., scale) that have accumulated within a conduit or container, and such fields will eventually remove such unwanted materials so that the unwanted material may be silted out or otherwise removed in the form of a fine powder.

It is further believed that radio frequency electromagnetic fields also contribute to sterilizing and decontaminating liquids (e.g., water) containing microbial contaminants (e.g., bacteria, amoeba, protozoa, algae, fungus, etc.). It is believed that a fast rising spike (i.e., quickly rising high amplitude waves) in the electromagnetic signal (as opposed to merely the implementation of low amplitude radio frequency waves) may be critical to biological contaminant purification. This spike appears to act as a shock to the bacteria, amoeba, protozoa, etc., within the water and breaks down their protective mechanisms.

It is believed that, when the system 100 is used primarily as a static high voltage generator, as in descaling applications, the preferred voltage output may be generally between 2,000 and 5,000 volts. It is believed, however, that the system 100 can function with a static field as low as 1,000 volts and as high 10,000 volts.

When the power unit 102 is used as a combination static high voltage generator and a high negative ion generator, it is believed that the preferred output voltage may be generally between 3,500 and 5,000 volts static field. When the power unit 102 is used strictly as a negative ion generator, it is believed that the preferred output voltage may be 1,500 to 3,000 volts static field with a resultant negative ion output of approximately 100 to 2,000 volts.

When the system 100 is used to control bacteria, ameba, protozoa, algae, fungus, etc., pulse rate frequencies of the electromagnetic field(s) 166 can be set to coincide with generally accepted frequencies that control particular types of organisms. For example, the control frequency for E. *Coli* bacteria is generally known to be 802 Hz. The voltage output on such frequencies can preferably be between 2,000 and 5,000 volts.

Experimental Setup—FIGS. 3A & 3B

The inventors understand that every liquid supply system is potentially different and may therefore require variations in system settings and treatment methods to optimize the treatment of a liquid that contains different types of unwanted material. In particular, the present inventors understand that the physical and chemical properties of a liquid, such as water, will likely vary from one supply system to the next, and such properties can impact the effectiveness of various types of electromagnetic fields in treating the liquid. For example, the mineral content, flow rate, temperature and pH of a liquid (e.g., water) in a system may affect the types and amount of scale and microbes that are likely to form in the liquid. Thus, for example, the mineral content, flow rate, temperature and pH of water may at least partially dictate the characteristics of electromagnetic fields that will be effective in treating the water. Furthermore, as the mineral content of water varies, the conductivity and capacitance of the water may vary. As a result, the resonant frequency of water may vary with mineral content, and variations in the resonant frequency of water may at least partially dictate the frequencies of electromagnetic fields that will prove effective in treating the water.

In order to develop an understanding of the optimum electromagnetic fields that may be useful in a variety of different applications, the inventors have developed experimental liquid (e.g., water) supply systems, such as system 300 shown in FIGS. 3A and 3B. The experimental system 300 simulates a typical real world, water supply system that may be used to grow or foster the formation of unwanted material, such as scale and accumulated microbial agents. It is believed that by measuring the characteristics (e.g., mineral content, flow rate, temperature and pH) of water in the system 300 over time, and testing various types of electromagnetic fields applied to the water as well as various methods of applying electromagnetic output fields to the water, optimum electromagnetic fields for a given water supply system may be identified. Water treatment data, among other data, obtained through testing of the experimental system 300 can be used to prescribe user input settings for the system 100 under a variety of water conditions, as well as develop adaptive (automatic) and specialized treatment protocols and related instructions that may be integrated into (e.g., programmed into) microcontrollers described herein, such as microcontroller 112 (FIG. 2A), microcontroller 621 (FIG. 3C) and microcontroller 422 (FIG. 4), for example.

As shown in FIG. 3A, the exemplary, experimental liquid (water) supply system 300 includes two loops, namely a hot loop 304B and a cold loop 313. A hot liquid tank 305A contains a volume of propylene glycol, (anti-freeze) 305B that is circulated throughout the hot loop 304B. The hot loop 304B includes a copper pipe 304 beginning at an inlet end 304C in contact with the propylene glycol 305B in the hot liquid tank 305A, and terminating at outlet end 304D in contact with the propylene glycol 305B in the hot liquid tank 305A. The propylene glycol 305B is circulated through the copper piping 325 by a pump 304A such that the propylene glycol 305B flows through the removable copper pipe 301A of heat exchanger 301, exits the hot liquid tank 305A into the inlet end 304C and returns to the hot liquid tank 305A from the outlet end 304D. Hot liquid tank 305A contains two heating elements 308A and 308B controlled by a programmable, differential temperature controller 307 to raise and control the temperature of propylene glycol between 70 degrees centigrade and 120 degrees centigrade. The hot loop piping 304B contains one thermocouple 302A installed before ABS plastic end-cap 327A, and a second thermocouple 327B installed after ABS end-cap 327B. The thermocouples 302A, 327B may be used to measure the temperature of the propylene glycol 305B entering and exiting the heat exchanger 301. Additionally, an electronic shut-on/off valve 303A may be installed after the inlet 304C of hot liquid tank 305A to turn on or off the propylene glycol.

The heat exchanger 301 comprising a quartz tube 328, removable copper pipe 301A, and ABS plastic end-caps 327A and 327B may be configured such that an annulus spacing 301B exists between the removable copper pipe 301A and the quartz tube 328. The ABS end-caps 327A and 327B may be designed to maintain the annulus spacing 301B and to form a path for make-up water 315B to flow through the heat exchanger 301 while propylene glycol 305B flows through the removable copper pipe 301A that is an integral part of the hot loop 304B. The heat exchanger 301 contains a flow correction baffle 311, whose purpose is to reduce turbulence in the annulus spacing 301B as make-up water 315B transverses the annulus spacing 301B of the heat exchanger 301.

An independent cool loop 313 may comprise PVC piping, a cold loop pump 313A to circulate the make-up water through the cold loop piping, an ultrasonic sensor 309A to monitor the make-up water flow-rate, and a cooling tower probe 310, where the make-up water can be treated to reduce calcium carbonate deposits on the removable copper pipe.

The probe 310 may be a probe and part of a "smart" probe control system described elsewhere herein. The cold loop piping carries make-up water from the outlet of the make-up water tank 315 through the annulus spacing of the heat exchanger 301 such that the make-up water flow direction is counter to the flow direction of the propylene glycol flowing in the removable copper pipe 301A within the heat exchanger 301. The cold loop piping also contains two thermocouples 302C and 302D installed immediately before the cold piping connects to the heat exchanger 301 and immediately after the heat exchanger 301 to measure make-up water temperature entering and exiting the annulus spacing of the heat exchanger 301, respectively.

A small secondary mixing loop 329 exists within the cold loop piping with electronic shut-on/off valves to facilitate mixing of the make-up water prior to the start of testing. At the start of any test, the electronic shut-on/off valve 303C is closed and electronic shut-on/off valve 303B is opened to facilitate the mixing of calcium chloride and sodium bicarbonate, necessary to produce calcium carbonate (scale) which precipitates out of mineralized water in cooling tower systems.

The make-up water tank 315 may be located between pump 313A, mixing loop 329 and the electric chiller 324. All three sub-systems, namely the make-up water tank 315, mixing loop 329, and pump 313A may be connected via PVC piping 326 to the heat exchanger 301. An electric chiller coil 320 connected to the electric chiller 324 may be provided within the make-up water tank 315 to maintain and control temperatures between 15 degrees centigrade and 35 degrees centigrade.

Figure 4:
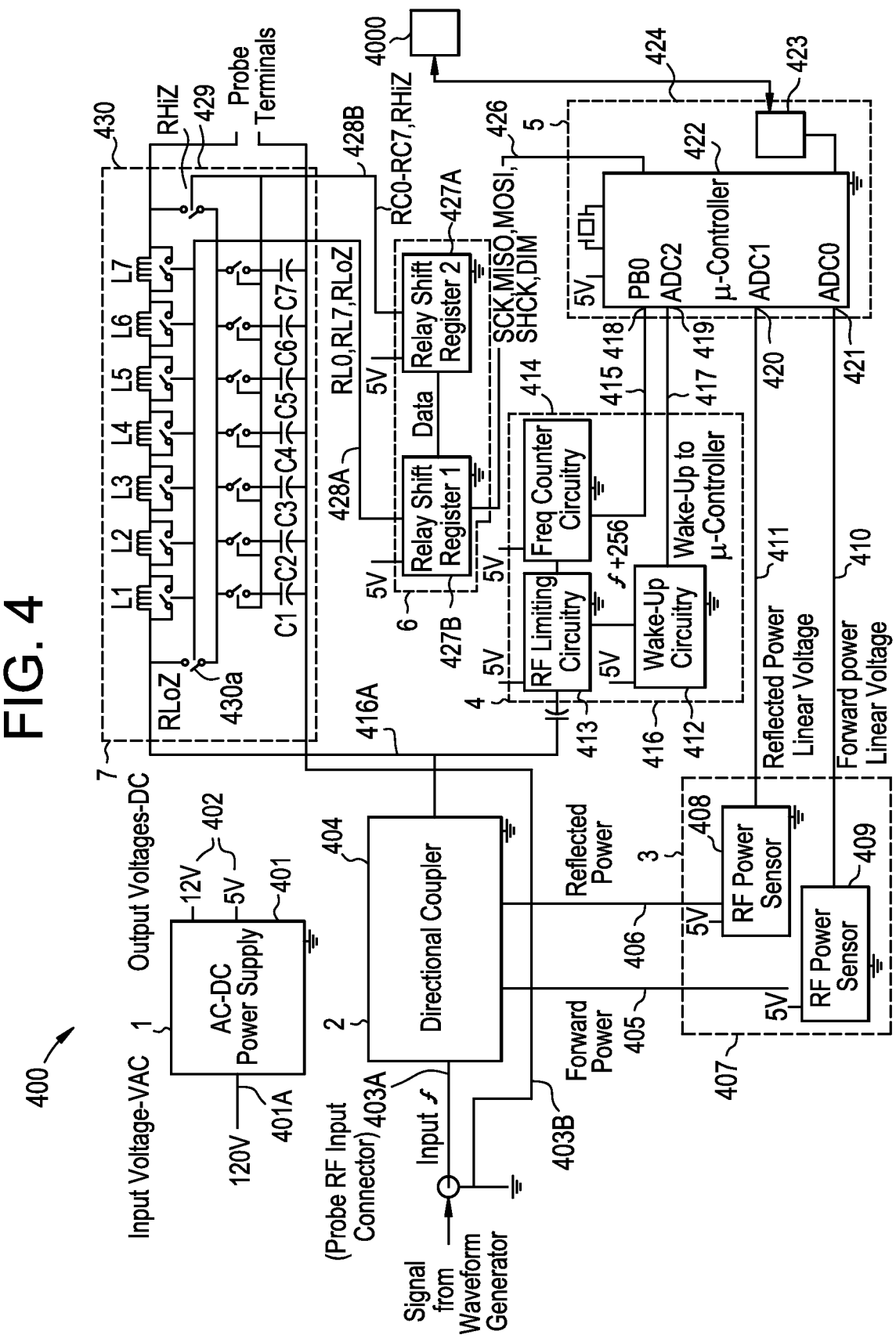
FIG. 4 depicts a block diagram of a smart probe control system according to one embodiment of the invention.

A liquid treatment system comprising, for example, an inventive waveform generator 314 and an inventive probe 310 (both described elsewhere herein) connected by a 50 Ohm coaxial transmission cable 312 and impedance matched by a impedance matching control system, such as system 400 in FIG. 4, may be used to treat liquid in the system 300 that contains unwanted material, such as calcium carbonate (scale).

A computer or other computing device 323 may be connected through a universal serial bus port, for example, to a port concentrator 322 to collect data related to pH, conductivity, hot temperature in, hot temperature out, cold temperature in, cold temperature out, and flow-rate, for example. This data may be used to compute a fouling resistance (delta-T measurement) of calcium carbonate, for example, that precipitates out of the make-up water 315B and adheres to the removable copper pipe 301A within the heat exchanger 301.

A flow meter 309B and its ultrasonic sensor 309A may be located between the probe 310 and thermocouple 302C. A TDS/conductivity meter 318 may be positioned in make-up water tank 315 to measure the TDS levels/conductivity of the make-up water 315B. A temperature-compensated pH sensor or meter 316 may be positioned in the make-up water tank 315 to measure the pH levels of the make-up water 315B.

An electric mixer 321 may be used to mix make-up water 315B prior to the start of testing in order to stabilize the pH and conductivity of the make-up water. The electric mixer 321 may be switched off after stabilization of pH and conductivity has been achieved.

Two heating elements 319A, 319B within the make-up water tank 315 may be used to raise the temperature of the make-up water during the mixing phase of calcium chloride and sodium bicarbonate to aid in achieving faster pH stability necessary to start a test.

It should be noted that the design of the heat exchanger, type of heat exchanger material, the amount of fouling resistance (e.g., scale) on the removable copper pipe of the heat exchanger, and the characteristics of the make-up water (conductivity, pH, temperature, etc.) may determine the total overall heat exchanger coefficient. The fouling resistance may be determined by measuring and calculating the heat transfer coefficient between the hot propylene glycol solution and the removable copper pipe 301A (heat surface) of the heat exchanger 301, measuring and calculating the heat transfer coefficient between the heat exchanger 301 and the make-up water 315B, the thickness of the removable copper pipe 301A, and the thermal conductivity of the removable copper pipe 301A.

In order to test the operation of devices 314 and 310 to treat liquids in system 300 that contain unwanted materials, it is first necessary to establish conditions that create such unwanted materials in the liquids, and then apply the inventive devices (e.g., devices 310 and 314), systems and methods described herein to such liquids. For example, as a starting test parameter, it is desirable to include or otherwise form about 2000 parts per million (ppm) of calcium carbonate precipitate in the make-up water 315B. Such an amount of calcium carbonate is typically found in cooling tower make-up water and is thought to be conducive to the growth of scale over time.

Once the amount of calcium carbonate (and associated, desired pH level) is obtained, it is believed that the make-up water 315B can be circulated through the system 300 for about 7 to 14 days with inventive devices (probe and generator), such as devices 310 and 314, turned off in order to grow scale (calcium deposits). As the make-up water 315B is circulated through the system 300 over the 7 to 14-day period, the pH level, flow rate and TDS level/conductivity of the make-up water can be monitored. If unwanted material (e.g., scale) is growing in the system 300, it is expected that the measured TDS levels and flow rates should decline over time. To determine whether scale, for example, is accumulating on the removable pipe 301A, the removable copper pipe 301A can be visually inspected through the quartz tube 328, or it can also be removed and visually inspected.

Further, once the growth of unwanted material, such as scale, has been confirmed the probe 310 may be operated to produce various types of electromagnetic fields in conjunction with generator 314 (and control system 400 in FIG. 4) to determine the optimum electromagnetic fields and application methods for removing unwanted materials in the system 300. For example, similar to the initial conditions described above, if the probe 310 is removing scale, the measured TDS levels and water flow rates should rise over time. As before, the removable copper pipe 301A can also be removed and/or visually inspected through the quartz tubing 328 to confirm that any existing scale buildup is being reduced.

Once test conditions for growing unwanted materials (e.g., scale) have been established as described herein, the system 300 can be initialized under similar conditions with the probe 310 and generator 314 activated and no unwanted material present. The system 300 may be run for 7 to 14 days, for example. If the system 300 is successfully preventing, etc., the growth of unwanted material, such as scale, then the water TDS levels and flow rates measured over the 7 to 14-day period should remain essentially constant, or should decline at a slower rate than they did in the initial 7 to 14-day period described above.

The experiments described above and herein may be repeated at various water pH levels, temperature, conductivity, flow rates and/or mineral contents in combination with various types of electromagnetic fields and electromagnetic field application methods in order to determine the optimum protocols to treat a liquid that contains unwanted materials in particular scale, under various water conditions. In addition, various probe designs, materials and placements can be tested to determine optimum probe designs, materials and placements for the treatment of a liquid that contains unwanted materials, in particular, scale. By way of further example, the inventive systems described herein (including the exemplary experimental set-up) may be used to test the viability of treating a liquid that contains unwanted material under various conditions using various combinations and types of electromagnetic fields, electromagnetic field application methods, probe designs, materials and/or probe positions.

Referring now to FIG. 3C, there is depicted an electromagnetic waveform generator 600 ("generator" for short) according to an embodiment of the invention. By way of example, and comparison with generator 114 in FIG. 2A, the generator 600 may have an impedance matched power rating of 500-1000 watts, may operate over a frequency band of 1.8 MHz to 54 MHz, include multiple types of modulated waveforms of 1 HZ to 1000 Hz, and may utilize a fixed output impedance (e.g., 50-ohm). The generator 600 may be impedance matched to an inventive probe described herein utilizing a control system, such as system 400 in FIG. 4, described herein as well. Because the generator 600 may be impedance matched with an inventive probe it may operate in a more energy (power) efficient manner than an unmatched generator and probe due to a reduction in so-called "reflected energy" (power) described in more detail below with respect to FIG. 4.

In one embodiment, to treat a liquid that contains unwanted material the generator 600 may output an AM or FM modulated carrier frequency of 40.6 MHz to an inventive probe described herein, such as probes 160, 160b, 260, 314 via a 50-ohm coaxial transmission cable. The generator 600 may include an AC to DC power supply module 616, RF power and preamplifier modules 622, 623, a detector directional coupler, a low pass filter, an RF current sampler module, a microcontroller 621 and an signal or waveform generating module (the words "module", "circuitry", "circuit" and "components" may be used interchangeably herein).

In an embodiment, the generator 600 may comprise voltage/current generation circuitry, thermal management circuitry, RF protection circuitry, a microcontroller, signal or waveform generation circuitry, and thermal protective components to name just a few of the major components.

The generator 600 may include additional circuitry or components but the additional circuitry and components are known to those skilled in the art.

The AC to DC power supply module 616 may be operable to accept AC power at an input 620. A metal oxide varistor (MOV) 619 may be connected in parallel between the phase and the neutral conductors to protect the generator 600 from electrical surges, voltage dips, variations, and brownout conditions. To reduce conducted emissions produced by the generator 600 from AC power sources, electromagnetic interference (EMI) filter 618 may be operable to attenuate the conducted emissions to comply with Federal Communications Commission commercial regulated Class A limit. The phase and neutral conductors from the EMI filter 618 may be connected to the AC power supply 616. The AC power supply 616 may be configured to accept 120-240 volts AC power and convert it to 48 Volts ("V")/25 Amps ("A") DC power. The power supply 616 may be connected to an On/Off switch in order to interrupt the supply of 48V DC power to the DC-to-DC circuitry 602 as needed.

The DC-to-DC circuitry 602 may be operable to generate 15V/1.5 A, 12V/5 A, 5V/1.5 A, −5V/1.5 A, 3.3V/0.5 A and 1.8V/0.5 A and supply such voltages and currents to power subsystem circuitry. The DC-to-DC circuitry 602 may include a limiter operable to limit an "in rush" current from the power supply 616 at start-up to 6.7 A, and limit an operating current to 23.5 A during normal operating conditions. Under and over-voltage circuitry may be operable to protect sensitive subsystem components such as the RF pre-amplifier 623 and RF amplifier 622 modules. The 48V and 15V power source may supply power to the RF power amplifier 622 and RF pre-amplifiers 623 modules, respectively. The modules 622, 623 may be switched on and off with an optoisolated switch 610 controlled by the DC-to-DC circuitry 602.

The DC-to-DC circuitry 602 may also be connected to amplifier fan enable circuitry that is operable to control fans 628A, 628B. Such circuitry may be mounted, for example, on a heat sink 627. The fans 628A, 628B may be operable to exhaust or otherwise remove heat emanating from the heat sink 627 and provide a high-temperature lockout condition signal to the microcontroller 621. The microcontroller 621 may be operable to remove or otherwise disconnect electrical power to the generator 600 in order to protect the generator 600 from overheating (thermal damage) upon receiving a high-temperature lockout condition signal. Thermal sensing may be provided by a 5 kΩ negative coefficient thermistor (temperature sensor) that may be mounted on the heat sink 627. Two comparators may be used as a part of monitoring circuitry to monitor the temperature sensor 612. The first comparator may be operable to turn the fans 628A, 628B "ON" whenever, for example, the temperature of a sensor rises to approximately 110° F., and turn the fans 628A, 628B "OFF" when the temperature of a sensor drops by approximately 5 degrees. A resistor may be used to introduce a small difference in temperature in order to allow enough heat to be drawn away from the heat sink 627 so that the fans 628A, 628B will not stutter "ON" and "OFF" as heat stored in the core of the heat sink 627 travels to the sensor mounted on the surface of the heat sink 627. The microcontroller 621 may be operable to store such temperatures.

The generator 600 may comprise a detector directional coupler 624A, low pass filter 624B, and a RF current sampler module 624C installed on the heat sink 627. Three outputs, namely forward power, reflected power and RF current may be conditioned or filtered by a low pass filter circuitry 611 and digitized upon input into an analog to digital converter input of the microcontroller 621. As explained in more detail elsewhere herein, the microcontroller 621 may be operable to compute a voltage standing wave ratio (VSWR) and provide a VSWR lockout signal to (i) enable the amplifier during startup, (ii) disable the amplifier based on detection of a high VSWR, or (iii) disable the amplifier during shut-down. The microcontroller 621 may be operable to provide a VSWR lockout signal upon detection of a 3 to 1 VSWR condition. The lookout signal may be used to prevent damage to the amplifier due to the build up of excessive heat caused by higher VSWR values. Higher VSWR values equate to higher reflected power values, which will ultimately damage the amplifier. Conversely, lower VSWR values will not damage the amplifier, and will lead to better energy efficiencies because substantially all or most of the energy (power) will be transferred to the liquid and will improve the treatment.

The microcontroller 621 may be an Atmel microprocessor, for example, that includes digital input and output ports, analog to digital converter input ports, onboard memory 601, a serial peripheral interface (SPI) bus 629 and a universal serial bus (USB) port 630.

The generator 600 may further include a high frequency (HF) synthesizer 604 operable to generate a sinusoidal carrier signal from 10 Hz to 50 MHz, for example. This signal may be input into a frequency multiplier 605 to produce a 20 Hz to 100 MHz carrier signal (i.e., an increase in frequency). A programmable signal generator 603 may be operable to generate pulse, sinusoidal, square and triangular waveforms, for example, in order to modulate the carrier from 1 Hz to 1000 Hz. The multiplied output of the high-frequency synthesizer and the output of the programmable signal generator 603 may be combined by the operational amplifier 606 functioning as a modulator. The operational amplifier's modulated output may be fed into variable gain amplifier 607. The amplifier 607 may be operable to generate and output a 50-ohm, modulated frequency carrier signal with a 0-dBm-power level, and a−0.25/+0.25 Vpp adjustable offset level with a modulation adjustment depth up to 100%. The output of the variable gain amplifier 607 may be connected to an input port of the pre-amplifier 622.

The microcontroller 621 may be further operable to control the operation of the signal generator 603 and synthesizer 604 in order to set and adjust the carrier frequency, the percentage of modulation, modulation frequency, modulation waveform, output gain and offset levels.

The pre-amplifier 622 may comprise a low noise amplifier with a 50-ohm input port and 50-ohm output port impedance operating at 15V/1 A. The pre-amplifier 622 may be operable to receive a maximum RF input power level of 0-dBm and output a maximum output power of 5 watts. The output port may be connected directly to the input port of the amplifier 623 enabling the amplifier 623 to produce 1000 watts of RF power. The amplifier 623 may be a 500-1000 watts broadband pallet amplifier operating at 48V/17 A, with a 50-ohm input impedance port and a 50-ohm output impedance port. In one embodiment, the amplifier 623 may comprise a RF power MOSFET transistor providing high gain RF output power in a small footprint. The amplifier 623 may include advanced thermal tracking bias circuitry allowing the amplifier 623 to operate with a stable gain over wide temperatures for sustained periods of time. The output of the amplifier 623 may be connected to the input port of the detector directional coupler 624A.

In one embodiment the detector directional coupler 624A may comprise a combination of RF detectors and a directional coupler. The directional coupler 624A may be a four-port, quarter-wavelength, coaxial coupler. The four ports may comprise input, output, forward power and reflected power ports. The forward and reflected power output ports of the directional coupler 624A may be connected to two, true power RMS RF power detector sensors. The RF power detector sensors may be operable to provide both forward and reverse power linear voltages to the conditioning circuitry 611, and then to analog-to-digital converter inputs of the microcontroller 621, where such inputs may be used to compute a VSWR (and, if necessary a VSWR signal).

The low pass filter 624B may comprise a 5 pole Chebyshev filter, for example. The low pass filter 624B may be operable to attenuate substantially all harmonics of a carrier frequency above 41 MHz in order to comply with the Class A radiated limits of the Federal Communications Commission's rules and regulations.

The RF current sampler circuitry 624C may be operable to sample the RF current on the transmission line and transform the sampled current to a desired current. The RF transmission line 622A from the amplifier 622 is the primary side fed through a wire wound ferrite toroidal coil, while the wound coil is the secondary side of the current transformer. The output signal from the wound toroidal coil may be conditioned by circuitry 611 and then sent to the analog-to-digital converter input port of the microcontroller's 621, where the analog signal is digitized, and its value stored. The microcontroller 621 may be operable to monitor the RF current value to protect against electrolysis of the cooling tower piping. For example, a current of more than 2 A may cause pinholes (leaks) on cooling tower piping. Accordingly, if the microcontroller 621 makes a determination that the RF current is greater than 2 A, the microcontroller 621 may be operable to reduce the amplifier's RF power (reduce the current) in an effort to protect against electrolysis.

As indicated above, thermal protective components, comprising a heat sink 627, copper heat sink spreader 628, and fans 628A and 628B may be used to remove heat generated by the pre-amplifier and amplifier 622,623.

Referring now to FIG. 4, there is depicted a smart probe control system 400 according to one embodiment of the invention. The system 400 may be operable to minimize impedance mismatches that may damage an electromagnetic waveform generator, such as generator 600 in FIGS. 3C and 3D.

As described before herein, an exemplary inventive system for treating a liquid that contains unwanted material may comprise an electromagnetic waveform generator connected to a probe, such as probes 160, 160b, 260 and 310 described above and herein via a signal transmission medium (e.g. cable). As a result of changes in conductivity and temperature, the dielectric permittivity and impedance of probes provided by the present invention may be constantly changing.

Generally, a probe provided by the present invention may form a capacitor that can be considered an equivalent electrical circuit comprised of a capacitance (C), in parallel with a resistance (R). The capacitance, resistance and dielectric permittivity (c) of the liquid, for example water, flowing through such a probe forms a complex impedance as in $Z^* = R + j\omega 1/c$.

In the case where the inventive probe is a cylindrical probe, such as probe 260, the impedance (Z) of such a probe may be calculated using Equation 1 below, where the impedance (Z) is proportional to the product of the inverse square root of dielectric permittivity of the water flowing through the probe, and the logarithmic ratio of the outer concentric and inner concentric electrodes (D) and (d) (e.g., positive and negative conductive elements) respectively:

$$Z = 138/(\sqrt{\in}) \times \mathrm{Log}(D/d) \qquad \text{Equation 1}$$

The dielectric permittivity may be expressed as a complex number:

$$\in = \in' - j\in''$$

Where $\in'$ is the dielectric constant and $\in''$ is the dielectric loss factor. The dielectric loss factor is a function of conductivity and frequency, where $\in'' = \sigma/2\pi f$, and $\omega = 2\pi f$.

The dielectric permittivity may be further expressed as a function of the dielectric constant and the conductivity σ as follows:

$$\Sigma = \Sigma' - j\,\alpha/\omega$$

When the impedance of an inventive probe is different from that of a connected electromagnetic waveform generator and transmission medium a "mismatch" is said to exist. When this occurs, some of the RF energy sent from the generator to the probe may be reflected by the probe, back down the transmission line, and into the generator. If the so reflected energy is strong enough, it can prevent the generator from operating correctly, and possibly ruin the generator.

In contrast, when an electromagnetic generator, transmission medium and probe are connected and each has the same impedance, the three components are said to be impedance "matched". When so matched, the amount of reflected RF energy may be minimized thus allowing a maximum amount of RF energy to be transferred from the generator to the probe.

To eliminate the issue of mismatched impedances (i.e., to match impedances), the present inventors provide a smart probe control system, such as exemplary system 400 depicted in FIG. 4.

In more detail, the ratio of forward RF energy (power) to reflected RF energy (power) is known as VSWR. VSWR is an important parameter used to calculate the amount of RF energy that may be being transferred to a probe and the amount of reflected energy that the probe does not receive. VSWR is typically the most important parameter for matching the impedance of a generator, transmission medium and probe. For example, a VSWR of 1.0:1 indicates a perfect match. As more energy is reflected, the VSWR may (undesirably) increase to 2.0:1, 3.0:1, or higher.

In one embodiment, a VSWR of 1.5:1 or less is most effective in the treatment of liquids that contain scale. Furthermore, a VSWR of 1.5:1 or less may prolong a generator's mean time between failures (MTBF) and make it more energy efficient.

The smart probe control system 400 may include a control device 422 (e.g., microcontroller, microprocessor, controller collectively "microcontroller" for short). The microcontroller 422 may be connected to the positive and negative conductive elements of a probe, such as probes 160, 160b, 260 and 310 that may have a fixed impedance of 50 Ohms, for example (not shown in FIG. 4). To achieve and maintain a VSWR of 1.5:1 or less, the microcontroller 422 may be operable to automatically measure both the forward RF energy/power (F) and reflected RF energy/power (R) of the positive and negative conductive elements, respectively. From such measurements the microcontroller 422 may be operable to compute a VSWR using Equation 2 below:

$$\text{VSWR} = (1 + \sqrt{R/F})/(1 - \sqrt{R/F}) \qquad \text{Equation 2.}$$

The microcontroller 422 may be operable to store the computed VSWR values as so-called "look up tables" in onboard memory or in associated memory (not shown in FIG. 4). Upon computing a VSWR value, the microcontroller 422 may be further operable to account for the effects of a given probe's reactance by controlling an impedance tuning section 425 to 430a to select (e.g., adding, subtracting) an appropriate capacitance to cancel out an inductive reactance, and/or select an appropriate inductance to cancel out capacitive reactance.

System 400 may also include a directional coupling section 404 that is operable to receive an RF signal from an electromagnetic waveform generator 403 and provide forward and reflected power to two RF power sensors 408, 409. RF power sensors 408, 409 may be operable to provide both forward and reverse power linear voltages to the microcontroller 422 via analog-to-digital converter inputs of the microcontroller 422 in order to allow the microcontroller 422 to compute a VSWR based on the forward and reflected voltages.

System 400 may further comprise an impedance tuning section 425 to 430a that includes banks of fixed capacitors $C_1$ to $C_n$ and inductors $L_1$ to $L_n$ (where "n" denotes the last capacitor or inductor in a bank), MOSFET shift registers 427A, 428A and relays 429, 430a. The microcontroller 422 may be operable to configure the tuning section 425 to 430a by, for example, selecting a combination of capacitors and inductors and selecting either the low impedance or the high impedance relay 429, 430a, respectively, to achieve an appropriate VSWR (e.g., low or lowest VSWR).

A signal output from the directional coupling section 404 may be sent to a power limiting section 416 that is operable to reduce the power of the signal, convert the signal to a square wave and feed the so converted signal to a divide by a 256-frequency counter 414. The signal output from counter 414 may be sent to a digital input port 418 of the microcontroller 422.

A "wake-up" signal generating section 412 may also be included. Section 412 may be operable to place the microcontroller 422 in a "sleep" mode when the microcontroller 422 is not required to compute a VSWR (e.g., when a previously computed VSWR stored in a look-up table is used), and to "awaken" the microcontroller 422 from a sleep mode in order to prompt the microcontroller 422 to compute a VSWR, for example.

In one embodiment of the invention, the microcontroller 422 may be operable to store specialized instructions (e.g., firmware) in a memory, where the specialized instructions may be used to configure the tuning section 425 to 430a. One such configuration may be used to, for example, minimize the number of tuning adjustments. For example, in one embodiment, the microcontroller 42 may access stored, specialized instructions to complete coarse tuning. In such a case the microcontroller 422 may be operable to send a signal to deactivate the high impedance relay 429 if necessary, and then control the operation of a MOSFET shift registers 427A, 428A to select an individual inductor $L_1$ to $L_n$ to determine a matching impedance. Upon selection of a set of inductors $L_1$ to $L_n$, the microcontroller 422 may then be operable to select capacitors $C_1$ to $C_n$ that are associated with a matching impedance, and compute VSWRs. If, upon making such computations, an appropriate VSWR is not computed, the microcontroller 422 may be operable to activate the low impedance relay 430a, and then repeat the selection of inductors $L_1$ to $L_n$, capacitors $C_1$ to $C_n$ and computations.

In one embodiment, upon completion of coarse tuning, the microcontroller 422 may be further operable to complete "fine" tuning of the previously selected inductor and capacitor combinations by further selecting (or de-selecting) such inductors/capacitors, and computing VSWRs to determine whether a desired VSWR or a VSWR of 1.5:1 or lower can be obtained.

In a further embodiment of the invention, system 400 (e.g., microcontroller 422) may be operable to continuously compute VSWR values and compare such computed values to a stored reference VSWR (e.g., 1.5:1). When a comparison indicates a computed VSWR is greater than the stored reference, the microcontroller 422 may initiate or repeat further coarse and fine tuning sequences. Otherwise, the microcontroller 422 may not initiate or repeat such tuning.

The present invention also provides the ability to service or otherwise maintain a treatment system. In one embodiment, the microcontroller may be operable to communicate with a testing apparatus 4000 to allow information about the operation of the system 400 and of a electromagnetic waveform generator and probe to be communicated to service or maintenance personnel. In response, testing apparatus 4000 may be operable to exchange specialized instructions with the microcontroller 422 in order to control the operation of system 400, a generator and/or probe, and/or otherwise obtain the status of system 400, generator or probe. The microcontroller 422 may do so via a communications port 423 of the microcontroller 422 to name just one of many ways in which system 400 may communicate with testing apparatus 4000. When testing apparatus 4000 comprises a portable or handheld test set, the communications port 423 may comprise a serial port operable to allow for connection of the handheld or otherwise portable test set by service or maintenance personnel. Alternatively, when testing apparatus 4000 comprises a remote station, the communications port 423 may comprise a modem or other necessary electronics necessary to transmit and receive information to/from such a remote station. Such a remote station may include an interface to permit information exchanged between the system 400, generator and probe to be viewed or otherwise accessed by service or maintenance personnel.

Figure 5:
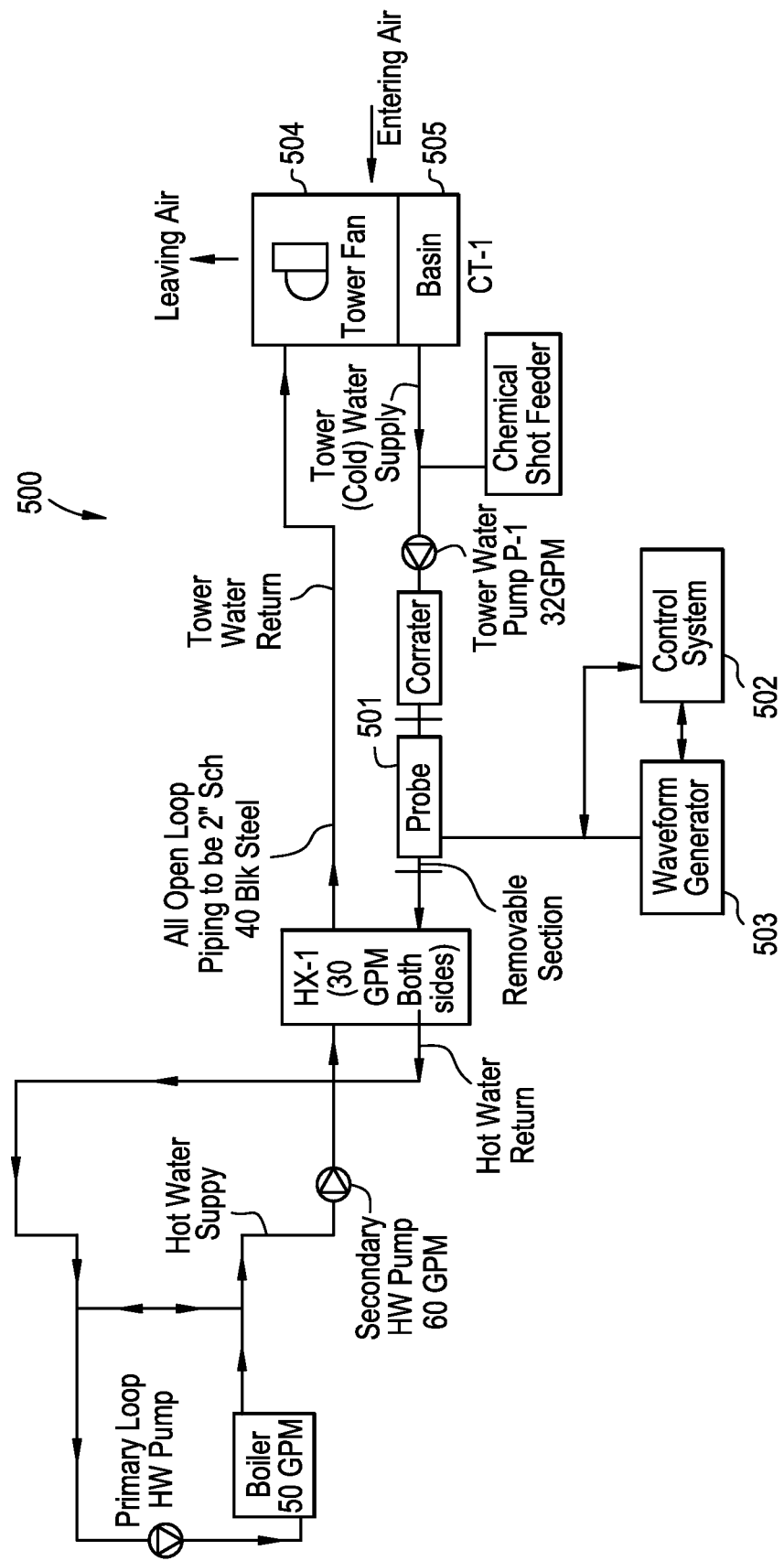
FIG. 5 depicts a block diagram of a cooling tower system that may utilize an exemplary probe and exemplary smart probe control system in accordance with one embodiment of the invention.

FIG. 5 depicts a block diagram of a cooling tower system 500.

Cooling towers use large amounts of water and other liquids for evaporative cooling. The evaporation process causes some portion of the liquids (e.g., water) to be evaporated, and other portions to remain in a basin 505 of a cooling tower 504. The portions that remain (i.e., are not evaporated) become highly concentrated with solids, such as calcium carbonate (scale), corrosive materials and other unwanted material. To reduce these unwanted materials, the unwanted materials must be periodically removed from the cooling tower 504 by a method referred to as "blow-down". Once some or all of the cooling tower liquid is drained, the original liquid level must be replenished; this includes the liquid lost through evaporation, blow-down, drift, and system leaks. As a result, the total dissolved solids, pH, temperature, and conductivity may be constantly changing, creating a dynamic liquid environment within the cooling tower 504.

In accordance with an embodiment of the invention, system 500 may include an exemplary, inventive probe 501, exemplary smart probe control system 502 and an exemplary electromagnetic generator 503 in accordance with one embodiment of the invention in order to treat a liquid in cooling tower 504 that contains unwanted material. Though not shown the system 500 may also be connected to a testing apparatus, such as testing apparatus 4000 depicted in FIG. 4, to allow information about the operation of the system 500 and of its electromagnetic waveform generator and probe to be communicated to service or maintenance personnel.

It should be apparent that the foregoing describes only selected embodiments of the invention. Numerous changes and modifications may be made to the embodiments disclosed herein without departing from the general spirit and scope of the invention. Though water has been the liquid utilized in the description herein, other suitable liquids may be used. For example, other liquids used in the heating and/or cooling systems of buildings. That is, the inventive devices, systems and methods described herein may be used to partially or substantially treat these other liquids as well.

What is claimed is:

1. A system for treating water comprising:
   an in-line device operable to generate a time-varying, modulated electromagnetic field and directly apply the modulated field to ions and biofilm in the water;
   a generator for generating a modulated signal, and for providing the modulated signal to the device to generate the time-varying, modulated electromagnetic field; and
   a microcontroller programmed to,
   send and receive information from one or more feedback sensors regarding a flow rate of the water and chemical properties of the water,
   adaptively adjust characteristics of the electromagnetic field, based on the flow rate of the water and chemical properties of the water, wherein such characteristics comprise modulation frequency, and modulation type,
   adjust a system impedance of the generator and the in-line device based on changes in the flow rate and chemical properties of the water, and
   adjust an amplitude of the time-varying, modulated electromagnetic field applied directly to the ions and biofilm in the water based on the adjusted impedance to optimize treatment of the water.

2. The system as in claim 1 wherein the microcontroller further comprises an impedance tuning section, the tuning section comprising one or more capacitors and inductors.

3. The system as in claim 2 wherein the microcontroller is further programmed to configure the tuning section by selecting one or more of the capacitors and inductors.

4. The system as in claim 1 wherein the microcontroller is further programmed to select a low impedance or high impedance relay.

5. The system as in claim 1 wherein the microcontroller is further programmed to continuously compute VSWRs and compare such computed VSWRs to a stored reference.

6. The system as in claim 5 wherein the stored reference comprises a VSWR of 1.5:1.

7. The system as in claim 1 further comprising a testing apparatus, wherein the testing apparatus is selected from a portable testing apparatus or a handheld testing apparatus, and wherein the microcontroller is further programmed to communicate the adjusted impedance and amplitude of the time-varying, modulated electromagnetic field to the portable testing apparatus or handheld testing apparatus.

8. The system as in claim 1 further comprising a modem that functions to transmit or receive data related to direct treatment of the water to, or from, a remote station.

9. The system as in claim 1 further comprising an interface at a remote station operable to permit data, related to treatment of the water to be viewed or otherwise accessed by service or maintenance personnel.

10. A system for treating water comprising:
    an in-line device operable to generate a time-varying, modulated electromagnetic field, and directly apply the modulated field to treat ions and biofilm in the water;
    a generator for generating a modulated signal, and for providing the modulated signal to the device to generate the time-varying, modulated electromagnetic field; and
    a microcontroller programmed to,
    send and receive information from one or more feedback sensors regarding a flow rate of the water and chemical properties of the water, adaptively adjust characteristics of the electromagnetic field based on the flow rate of the water and chemical properties of the water wherein such characteristics comprise modulation frequency, and modulation type, adjust a system impedance of the generator and the in-line device based on the flow rate of the water and chemical properties of the water, adjust an amplitude of the time varying, modulated electromagnetic field applied directly to the ions and biofilm in the water based on the adjusted system impedance to optimize treatment of the water, and communicate the adjusted impedance and amplitude of the time-varying, modulated electromagnetic field, to a testing apparatus.

11. The system as in claim 10 wherein the microcontroller further comprises an impedance tuning section, the tuning section comprising one or more capacitors and inductors.

12. The system as in claim 11 wherein the microcontroller is further programmed to configure the tuning section by selecting one or more of the capacitors and inductors.

13. The system as in claim 11 wherein the microcontroller is further programmed to select a low impedance or high impedance relay.

14. The system as in claim 11 wherein the microcontroller is further programmed to continuously compute VSWRs and compare such computed VSWRs to a stored reference.

15. The system as in claim 14 wherein the stored reference comprises a VSWR of 1.5:1.

16. The system as in claim 10 further comprising a testing apparatus operable to receive the communicated adjusted impedance and amplitude of the time-varying, modulated electromagnetic field.

17. The system as in claim 10 further comprising a modem that functions to transmit or receive data related to direct treatment of the water to, or from, a remote station.

18. The system as in claim 10 further comprising an interface at a remote station operable to permit data, related to treatment of the water to be viewed or otherwise accessed by service or maintenance personnel.

19. A system for treating unwanted material in cooling tower liquid comprising:

an in-line device operable to generate an electromagnetic field to treat the unwanted material in the cooling tower liquid;

a generator for generating a signal, and for providing the signal to the in-line device to generate the electromagnetic field; and a microcontroller programmed to,
send and receive information from one or more feedback sensors regarding a flow rate of the cooling tower liquid and chemical properties of the liquid, adaptively adjust characteristics of the electromagnetic field based on the flow rate of the cooling tower liquid and chemical properties of the liquid, adjust a system impedance of the generator and the in-line device based on the flow rate of the cooling tower liquid and chemicals properties of the liquid, and adjust an amplitude of the electromagnetic field based on the adjusted system impedance to optimize treatment of the cooling tower liquid.

20. The system as in claim 19 wherein the cooling tower liquid comprises water.

21. The system as in claim 20 wherein the unwanted material comprises biofilm.

22. The system as in claim 20 wherein the unwanted material comprises scale forming ions.

23. The system as in claim 20 further comprising an apparatus operable to communicate information about the operation of the system to service or maintenance personnel.

24. The system as in claim 19 in combination with a cooling tower.

* * * * *